US007767033B2

(12) United States Patent
Fujiwara et al.

(10) Patent No.: US 7,767,033 B2
(45) Date of Patent: Aug. 3, 2010

(54) METHOD FOR SURFACE TREATMENT OF AN INTERNAL COMBUSTION PISTON AND AN INTERNAL COMBUSTION PISTON

(75) Inventors: Nobuyuki Fujiwara, Ueda (JP); Yoshio Miyasaka, Nagoya (JP)

(73) Assignees: Art Metal Mfg Co., Ltd., Nagano (JP); Fuji Kihan Co., Ltd., Aichi (JP)

( * ) Notice: Subject to any disclaimer, the term of this patent is extended or adjusted under 35 U.S.C. 154(b) by 0 days.

(21) Appl. No.: 11/826,818

(22) Filed: Jul. 18, 2007

(65) Prior Publication Data

US 2008/0022962 A1 Jan. 31, 2008

(30) Foreign Application Priority Data

Jul. 28, 2006 (JP) ............................. 2006-206947
Jun. 25, 2007 (JP) ............................. 2007-166713

(51) Int. Cl.
*C23C 8/00* (2006.01)
*F02F 3/00* (2006.01)
*B23P 15/10* (2006.01)
*B41N 1/24* (2006.01)

(52) U.S. Cl. ............... 148/217; 123/193.6; 29/888.047; 29/888.048; 427/142

(58) Field of Classification Search ................. 148/217; 123/193.6; 29/888.047, 888.048; 427/142
See application file for complete search history.

(56) References Cited

U.S. PATENT DOCUMENTS 4,975,243 A * 12/1990 Scott et al. .................. 420/534
6,863,922 B2 3/2005 Ogihara et al.
6,913,207 B2 * 7/2005 Miyamoto et al. .......... 239/135

FOREIGN PATENT DOCUMENTS

| | | |
|---|---|---|
| JP | 05-086443 | 4/1993 |
| JP | 10-176615 | 6/1998 |
| JP | 11-131257 | 5/1999 |
| JP | 11-236677 | 8/1999 |
| JP | 2000-282259 | 10/2000 |
| JP | 2002-161371 | 6/2002 |

* cited by examiner

*Primary Examiner*—Roy King
*Assistant Examiner*—Jessee R. Roe
(74) *Attorney, Agent, or Firm*—Shlesinger, Arkwright & Garvey LLP

(57) ABSTRACT

A method for surface treatment capable of easily improving a mechanical strength of an internal combustion piston at a reasonable cost is provided. A modified surface layer is formed by injecting injection powders containing a reinforcing element to be collided with an Al—Si alloy-based piston obtained by casting and forging by injecting under predetermined conditions, the reinforcing element being diffused and penetrated in the piston to improve the strength thereof. When a function, such as fuel modification, is imparted to the modified surface layer, an element exhibiting a photocatalytic function by oxidation, such as Ti, Sn, Zn, Zr, or W, is selected as the reinforcing element. By locally heating and cooling performed on the piston surface by the collision with the injection powders, alloy elements are fine-grained by recrystallization, the reinforcing element in the injection powders is diffused and penetrated in the piston surface by activated adsorption, and a modified layer having a uniformly fine-grained microstructure containing the alloy elements and the reinforcing element is formed. As a result, besides improvement in strength of the piston, by the selection of the above element, such as Ti, the photocatalytic function, such as fuel modification, can also be obtained.

5 Claims, 16 Drawing Sheets

Surface condition before treatment

Surface condition after treatment of the present application

Surface analysis image of modified layer composition

Surface analysis image of Al component

Surface analysis image of Si component

Surface analysis image of Fe component

Analysis position

Si line analysis

Al line analysis

Fe line analysis

Visual field for analysis of object to be treated by nitrogen gas

Si line analysis

N line analysis

Fatigue test results (Fatigue strength comparison)

Tensile test results (Tensile strength comparison)

Surface analysis image of modified layer composition

Surface analysis image of Al component

Surface analysis image of Si component

Surface analysis image of Ti component

Surface analysis image of O component

Surface analysis image of modified layer composition

Surface analysis image of Al component

Surface analysis image of Si component

Surface analysis image of Sn component

Surface analysis image of O component

Analysis portion

Al line analysis

Si line analysis

Sn line analysis

O line analysis

Surface analysis image of modified layer composition

Surface analysis image of Al component

Surface analysis image of Si component

Surface analysis image of Zn component

Surface analysis image of O component

Pyrolysis GC-MS analysis result (Embodiment)
(Light oil collided with piston injected with Sn-based injection powders)

Pyrolysis GC-MS analysis result (comparative example)

(Untreated light oil)

(Exhaust-gas temperature = average for 60 seconds)

Graph for change in exhaust-gas temperature

METHOD FOR SURFACE TREATMENT OF AN INTERNAL COMBUSTION PISTON AND AN INTERNAL COMBUSTION PISTON

BACKGROUND OF THE INVENTION

1. Field of the Invention

The present invention relates to methods for surface treatment of internal combustion pistons and to internal combustion pistons, and more particularly, relates to a method for surface treatment of an internal combustion piston performed by injecting and colliding injection powders on the surface thereof and to an internal combustion piston modified the surface by the above method.

2. Description of the Related Art

An internal combustion piston performs a reciprocating motion repeatedly under explosive pressure and high temperature conditions. Accordingly, the internal combustion piston is required to have a high strength.

On the other hand, in order to reduce fuel consumption, it is necessary to save weight by reducing thickness, and as a result, contradictory requirements, that is, increasing strength and saving weight must be satisfied simultaneously.

In particular, in recent years where environmental conservation has attracted a great deal of attention from society, in order to reduce the generation of $CO_2$ gas and the like, and reduce energy consumption by improving fuel consumption, the requirements described above have become increasingly stronger.

In response to the requirements as described above, to save weight and improve the mechanical strength of the internal combustion piston, for example, the following methods have been carried out.

Improvement in Mechanical Strength in Casting and/or Forging Step

Prevention of Surface Flaw/s

One possible reason for the degradation in strength of the internal combustion piston is, for example, minute surface flaws, such as cold shuts, generated on a casting surface of the internal combustion piston during a casting step.

When such surface flaws are generated, so-called "notch embrittlement" occurs in which a stress is concentrated, for example, at a recessed portion where the surface flaw occurs, and the strength of the internal combustion piston is degraded. As a result, weight saving by reducing the thickness becomes difficult.

Examples of measures that have been performed to prevent the generation of minute surface flaws, such as cold shuts, generated during a casting step include, for example, improvement of the processes and equipment, such as adjustment of the casting temperature, improvement in fluidity of the molten metal, and improvement of a gating system.

Improvement in Mechanical Strength by Changing Materials (Type of Steel and Composition)

In addition, as another method for improving the mechanical strength of the internal combustion piston, it has been attempted to obtain a higher mechanical strength by composition of the material (such as an aluminum alloy) of the internal combustion piston itself. When a higher mechanical strength of the internal combustion piston is obtained by adjusting the alloy components, the contents thereof, and the like, the thickness of the internal combustion piston can be reduced according to the higher mechanical strength. As a result, weight saving of the internal combustion piston can be realized.

Improvement in Mechanical Strength in Steps Other Than Casting and/or Forging Step Furthermore, a method for improving the mechanical properties of an aluminum alloy member, which is performed in a step other than the above-described casting step, has also been proposed. As one example of this method, a method for surface treatment of an aluminum alloy member by performing a shot peening treatment on the surface thereof has been disclosed.

As one example of the method described above, a method for surface treatment has been proposed in which shot peening is performed by injecting a mixture of a shot material and fine particles so that the fine particles are shot together with the shot material onto a surface portion of an aluminum alloy member and are dispersedly embedded therein (see Claim 1 of Japanese Patent KOKAI (LOPI) No. H5-86443).

According to the method described above, according to inherent properties of the fine particles thus embedded by the shot peening, abrasion resistance and corrosion resistance are improved, and in addition, strength reliability of the aluminum alloy member can be increased (see paragraph [0017] of Japanese Patent KOKAI (LOPI) No. H5-86443).

Improvement in Fuel Consumption by a Method Other Than the Weight Saving Due to Increase in Strength Weight saving due to the increase in strength of the piston is not the only method for achieving the objects i.e., improvement of the fuel consumption in internal combustion engines and reducing of the generation of $CO_2$ gas concomitant therewith. For example, the objects can also be achieved by improving the combustion efficiency of fuel in the combustion chambers.

Specifically, as the combustion efficiency of fuel in the combustion chambers is improved to approach complete combustion, a larger amount of work can be obtained by consuming a smaller amount of fuel, and as the combustion approaches complete combustion, the amounts of $CO_2$, $NO_x$, and so forth in the exhaust gas can also be reduced.

From the points described above, fuel direct injection systems which can easily improve the combustion efficiency have been widely adopted in gasoline and diesel internal combustion engines, thereby effectively reducing the fuel consumption and the amount of exhaust gas.

However, in a direct injection type internal combustion engine, at an ignition stage of the engine, since the temperature of a top surface of the piston is not sufficiently heated, injected fuel is not completely vaporized, and complete combustion cannot be performed. As a result, there has been a problem in that harmful substances are contained in an exhaust gas.

In addition, in the direct injection type engine as described above, since an injector is provided inside a cylinder, for example, soot is liable to adhere to a nozzle, and the amount of deposited carbon is relatively large as compared to that of a port-type engine. The deposits caused by adhesion of soot and the like may prevent precise fuel injection in some cases. Furthermore, the addition of bio fuel, which is being increasingly adopted nowadays, may also produce deposits, and there is some concern that the output and fuel consumption will be degraded thereby.

Among the problems described above, attempts have been made to solve problems such as combustion degradation by the change in volume of a combustion chamber caused by adhesion of deposits; combustion degradation caused by mixed gas combustion occurring before ignition using an ignition plug; and an increase in the amount of harmful exhaust components generated and discharged from deposits, for example, by removing soot generated by combustion of fuel in the combustion chamber, and deposits formed by adhesion of lubricants coming into the combustion chamber and unburned fuel components to the inner surface of the combustion chamber. In order to decompose and remove the deposits as described above, a method has been proposed including the steps of applying a silica sol mixed with fine titanium oxide particles to a surface of a component forming the inner surface of a combustion chamber (such as a top surface of a piston), and then firing to form a titanium oxide layer (see Japanese Patent No. 3541665).

Furthermore, in order to improve combustion efficiency of internal combustion engines and to reduce the amounts of harmful substances contained in the exhaust gas, a fuel modification method has also been proposed in which a photocatalytic material, such as titanium oxide, is placed in a fuel tank of the internal combustion engine (see Japanese Patent KOKAI (LOPI) No. H10-176615).

In the above-described techniques in the related art, there have been the following problems.

Problems with Previous Methods for Improving Mechanical Strength

Problems with Improving Mechanical Strength During a Casting and/or Forging Step Prevention of Surface Flaws In order to prevent the generation of surface flaws, such as cold shuts, during casting, when the casting process, equipment, and the like are complicated as described above. As a result, the manufacturing cost of the internal combustion piston increases.

In addition, according to the current technical level, although the generation of surface flaws, such as cold shuts, can be reduced by improving the process, equipment, and the like as described above, it cannot be completely prevented.

Accordingly, when it is attempted to overcome the problem of notch embrittlement caused by the presence of surface flaws, such as cold shuts, after the casting and/or forging step, a separate treatment must be performed to repair the surface flaws.

Improvement in Mechanical Strength by Changing Material

In addition, according to the method for improving the strength of an internal combustion piston by changing the composition of the alloy components comprising the internal combustion piston, although the strength can be effectively increased, it is difficult to form uniformly fine-grained alloy components during casting. As a result, in some cases there may be problems such as the mechanical strength not being sufficiently improved, the quality being variable, and so on.

In addition, the improvement in material strength causes degradation in casting and forging properties and workability; in particular, as the strength is increased, cutting workability is seriously degraded. That is, there is a conflicting relationship between improvement in strength and improvement in workability always at all times.

Accordingly, since the improvement in strength as described above causes degradation in the production efficiency of internal combustion pistons and an increase in manufacturing costs, it is difficult to simply increase the strength.

Problems with Surface Modification by Shot Peening

When the method for surface treatment disclosed in Japanese Patent KOKAI (LOPI) No. H5-86443 is used to improve the mechanical strength of an internal combustion piston, since the surface modification as described above is performed on an internal combustion piston processed by a casting and/or a forging step, the casting and/or forging step can be performed by a method performed in the past. Hence, the casting and/or forging step is free from the problems caused by changes of the process, equipment, molten metal composition, and the like.

In order to perform the surface treatment as described above, in the method disclosed in Japanese Patent KOKAI (LOPI) No. H5-86443, the fine particles are dispersedly "embedded" in the surface portion of the aluminum alloy member, as described above, and due to the inherent properties of the embedded particles, the abrasion resistance and the corrosion resistance are improved, so that the strength reliability of the aluminum alloy member is enhanced.

In addition, in order to perform the "embedment" described above, the fine particles to be embedded are mixed with shot material having a diameter larger than that of the fine particles, followed by shot peening (for example, see paragraph [0040] of Japanese Patent KOKAI (LOPI) No. H5-86443).

However, according to the method disclosed in Japanese Patent KOKAI (LOPI) No. H5-86443, the above fine particles are only "embedded" in the surface portion of the aluminum alloy member, and a strong bonding state is not produced between the fine particles and the aluminum alloy member. Hence, the fine particles are liable to peel off or fall from the surface portion, and once they peel off or fall, improvement in the mechanical strength due to the inherent properties of the fine particles cannot be expected.

In addition, in Japanese Patent KOKAI (LOPI) No. H5-86443, a method for diffusing the fine particles embedded in the surface of the aluminum alloy member into the surface has also been disclosed; however, an additional heating treatment or the like needs to be performed on the aluminum alloy member in which the fine particles are embedded (for example, see Claim 3 and paragraphs [0038] and [0039] of Japanese Patent KOKAI (LOPI) No. H5-86443). As a result, the treatment time and costs increase due to the increased number of steps.

In addition, when the heat treatment as described above is performed, the size of the aluminum alloy member may be changed, or a strain may be generated in some cases. As a result, strict control of the temperature, time, and the like of the heat treatment is required.

As described above, in the internal combustion piston, since minute surface flaws, such as cold shuts, cause notch embrittlement, in order to improve the strength, it is very important to repair the surface flaws.

However, in the method disclosed in Japanese Patent KOKAI (LOPI) No. H5-86443, no mechanism for repairing the surface flaws as described above is provided, and in addition, the embedment of the fine metal particles in the aluminum alloy member as described above actually exacerbates notch embrittlement.

In addition, as described above, uniformly fine graining the alloy elements is beneficial in improving the mechanical strengths of the internal combustion piston and in improving the quality uniformity; however, in the invention of Japanese Patent KOKAI (LOPI) No. H5-86443, no mechanism for realizing this has been disclosed.

Accordingly, uniformly fine graining the alloy element must be realized at the casting stage.

In addition, according to the technique in the related art, improvement in strength in a high-temperature region in which a piston is used has not been disclosed, and although a conventional surface treatment, such as shot peening or heat treatment, can improve the strength in a room-temperature region by the effects of residual stress, surface hardening, and the like, in a high-temperature region, which is the particular temperature region where the piston is used, the stress is released, so that the effects disappear.

Problems with Conventional Piston Having Titanium Oxide Layer (Japanese Patent No. 3541665)

As described above, in the invention disclosed in Japanese Patent No. 3541665 in which a titanium oxide layer is formed on the wall surface forming the inner surface of the combustion chamber (such as the top surface of the piston), the deposits can be decomposed by a photocatalyst function to decompose organic materials, and by this decomposition and removal of the deposits, an improvement in combustion efficiency can be expected.

In addition to the function to decompose organic materials such as deposits, since the photocatalyst has an effect of decomposing and modifying the fuel itself to improve the combustion efficiency and to reduce the amounts of harmful substances in the exhaust gas (see Japanese Patent KOKAI (LOPI) No. H10-176615), depending on the conditions, modification of fuel can also be expected in the invention of Japanese patent No. 3541665, in which the titanium oxide layer is formed on the inner surface of the combustion chamber of the internal combustion engine.

However, in order to decompose organic materials and modify fuel with the photocatalyst, strong UV irradiation or a high temperature is necessary. Hence, in the related technique disclosed in Japanese Patent No. 3541665, when the inside of the combustion chamber of the engine is heated to a temperature at which titanium oxide sufficiently functions as a catalyst, the effect of decomposing and removing deposits and, depending on the case, the effect of modifying the fuel can be expected. However, when the temperature inside the combustion chamber is not sufficiently increased at a starting stage, the conditions necessary for sufficiently obtaining this catalytic function cannot be satisfied, and as a result, the catalytic function does not work.

Hence, according to the technique disclosed in Japanese Patent No. 3541665, since the effect of decomposing organic materials and the effect of modifying the fuel cannot both be obtained immediately after starting the internal combustion engine, the fuel efficiency immediately after starting cannot be improved, and as a result of the incomplete combustion and the like, harmful substances are discharged together with the exhaust gas.

From 2010, the automobile driving pattern used for fuel consumption measurement is scheduled to be changed from the current 10.15 mode to the JC08 mode. In the 10.15 mode, measurement is performed such that driving is started when the engine is warm, the maximum velocity is set to 70 km/h, and mild deceleration and acceleration are performed. The JC08 mode, however, is a method to more precisely measure actual fuel consumption by using a driving pattern in which driving is started when the engine is at room temperature (at a starting stage), and acceleration to 60 km/h and deceleration are repeatedly performed. Hence, even when the same car is used, the fuel consumption measured with the JC08 mode is inferior to that measured with the 10.15 mode.

In new fuel consumption standards announced in 2007 by the Ministry of Economy, Trade, and Industry, values measured in the JC08 mode have been disclosed, and hereinafter, regulation will be performed according to the JC08 law. In order to satisfy the required performance, it is crucial to develop techniques capable of improving the combustion efficiency of a direct injection engine at a starting stage, and since there is a strong market demand for such techniques, development of techniques satisfying the new regulation has been carried out by various car producers.

SUMMARY OF THE INVENTION

Accordingly, the present invention has been conceived to solve the problems of the above techniques in the related art, and an object of the present invention is to provide a method for surface treatment of an internal combustion piston and an internal combustion piston modified the surface by this method for surface treatment, the method for surface treatment being capable of easily improving the mechanical strength, in particular, the mechanical strength in a high temperature region, of an internal combustion piston at a reasonable cost without causing an adverse influence on production efficiency, such as casting and forging properties and workability, by injecting injection powders under predetermined conditions on the surface of an internal combustion piston produced by casting and/or forging. With this method for surface treatment, a strong modified surface layer integral to the surface of the internal combustion piston can be formed without separately performing a heat treatment or the like. Furthermore, various treatments, for example, to repair minute surface flaws, such as cold shuts, and to fine grain alloy elements in the vicinity of the surface of the piston, can also be performed.

In addition, another object of the present invention is to provide a method for surface treatment of an internal combustion piston and an internal combustion piston modified the surface by this method for surface treatment, wherein fuel can be modified, even in an internal combustion chamber in which the temperature of a top surface of the piston is low, by imparting a photocatalytic function, which works as a catalyst without UV irradiation and even in a room-temperature atmosphere, to the modified surface layer formed in order to improve the strength of the internal combustion piston. As a result, besides the improvement in combustion efficiency obtained, for example, by weight saving concomitant with the improvement in strength of the piston, improvement in combustion efficiency and reduction in the amount of harmful substances in the exhaust gas immediately after starting the internal combustion engine can also be achieved.

In order to achieve the objects described above, a method for surface treatment of an internal combustion piston of the present invention, comprises the steps of: injecting injection powders containing a reinforcing element improving the strength of the alloy by being diffused and penetrated in the alloy comprising the piston and the injection powders having a diameter of 20 μm to 400 μm, preferably 20 μm to 200 μm to be collided with a surface of an internal combustion piston obtained by casting and forging of an aluminum-silicon alloy at an injection speed of 80 m/s or more or at an injection pressure of 0.3 MPa or more whereby removing oxides of surface flaw portions generated on the piston surface by the casting and forging, repairing the surface flaws generated on the surface, making an alloy element of the alloy of the piston being fine-grained in the vicinity of the surface of the piston, and defusing and penetrating the reinforcing element in the injection powders in the vicinity of the surface of the piston, whereby forming a modified layer having a uniformly fine-grained metal microstructure which contains the alloy element and the reinforcing element on the surface of the piston.

In the method for surface treatment described above, an element exhibiting a photocatalytic function by oxidation, as well as having a function of improving the strength of the alloy, such as at least one element or a plurality of elements selected from the group consisting of Ti, Sn, Zn, Zr, and W, and more preferably at least one of or both of Ti and Sn, may be selected as the reinforcing element, and the modified layer may be formed on a top surface of the piston, in which the reinforcing element is oxidized so that bonding quantity of oxygen is decreased as goes from a surface to an inside of the modified layer.

Further, in the structure described above, although the improvement in strength of the alloy and the photocatalytic function are obtained by a common element, for example, injection powders containing at least one element or a plurality of elements selected from the group consisting, for example, of Ti, Sn, Zn, Zr, W and preferably at least one of or both of Ti and Sn as a photocatalytic element exhibiting a photocatalytic function by oxidation, in addition to a reinforcing element such as Fe, Ni, Cu, Cr, Mn, Si, or C, may be used as the injection powders, and the photocatalytic element may be diffused and penetrated in the vicinity of the surface of the piston, so that a modified layer having a uniformly fine-grained metal microstructure which contains the alloy element, the reinforcing element, and the photocatalytic element is formed on a top surface of the piston, in which the photocatalytic element is oxidized so that bonding quantity of oxygen is decreased as goes from the surface to the inside of the modified layer.

In addition, in separately comprised and prepared injection powders containing a reinforcing element and injection powders containing a photocatalytic element exhibiting a photocatalytic function by oxidation and having a particle diameter of 20 μm to 400 μm, respectively, and then these two types of injection powders may be mixed. Further, the injection powders are injected on the same object by a common blast machine or may be injected separately by respective blast machines. In this case, the injection powders containing a photocatalytic element are injected at an injection speed of 80 m/s or more or at an injection pressure of 0.3 MPa or more so that the photocatalytic element is diffused and penetrated in the vicinity of the surface of the piston, and as a result, a modified layer having a uniformly fine-grained metal microstructure which contains the alloy element, the reinforcing element, and the photocatalytic element is formed on a top surface of the piston, in which the photocatalytic element is oxidized so that bonding quantity of oxygen is decreased as goes from the surface to the inside of the modified layer.

In addition, the top surface of the piston after performing the surface modification by the injection powders including the reinforcing element may be injected with injection powders having a diameter of 20 μm to 400 μm and containing a photocatalytic element exhibiting a photocatalytic function by oxidation at an injection speed of 80 m/s or more or at an injection pressure of 0.3 MPa or more so that the photocatalytic element is diffused and penetrated in the vicinity of the surface of the piston, and as a result, the structure of the modified layer is changed to one in which a uniformly fine-grained metal microstructure is formed, containing the alloy element, the reinforcing element, and the photocatalytic element, and in which the photocatalytic element is oxidized so that bonding quantity of oxygen is decreased as goes from the surface to the inside of the modified layer.

When the photocatalytic function is imparted to the modified layer formed on the surface of the internal combustion piston by diffusion and penetration of the photocatalytic element as described above, the injection powders containing the reinforcing element and/or the photocatalytic element may further include a noble metal element, and the noble metal element may be supported in the modified layer.

In the method described above, since the noble metal element is contained in the injection powders containing the reinforcing element and/or the photocatalytic element, the noble metal element can be supported simultaneous with diffusion and penetration of the reinforcing element and the photocatalytic element; however, for example, after the modified layer is formed, different injection powders containing a noble metal element may be injected thereon, so that the noble metal element can be supported in the modified layer.

The above injection powders may contain at least one element or a plurality of elements selected from the group consisting of Fe, Mn, Zn, Ti, C, Si, Ni, Cr, W, Cu, Sn, and Zn as the reinforcing element for improving the strength of the alloy, and the modified layer having a uniformly fine-grained metal microstructure which contains silicon as the alloy element and the reinforcing element in the injection powders is formed.

When the photocatalytic function is imparted to the modified layer formed on the piston surface, and when at least one element or a plurality of elements selected from the group consisting of Fe, Ni, Cu, Cr, Mn, Si, and C, which exhibit no photocatalytic function by oxidation, is selected as the reinforcing element, at least one element or a plurality of elements selected from the group consisting of Ti, Sn, Zn, Zr, and W may be selected as the photocatalytic element.

In addition, the piston preferably comprises an aluminum-silicon alloy containing 9% to 23% of silicon.

When a mixed fluid including the above injection powders and nitrogen gas is injected on the piston surface to form a nitrogen compound generated by a chemical reaction between the nitrogen gas and a silicon, aluminum, or iron component of the piston, and the nitrogen compound is diffused and penetrated in the piston surface, thereby a nitride compound layer can be generated.

Preferably, the nitrogen gas is a low-temperature compressed nitrogen gas at a temperature of 0° C. or less, and by the use of this low-temperature compressed nitrogen gas, the temperature of the piston is increased to its recrystallization temperature or more and is rapidly cooled to room temperature or less in a very short time.

By the above diffusion and penetration, an aluminum nitride layer and a silicon nitride layer can be formed on the piston surface.

In addition, an internal combustion piston of the present invention comprises a modified layer produced by a surface treatment including the steps of: injecting injection powders having a diameter of 20 μm to 400 μm, and preferably 20 μm to 200 μm, and containing a reinforcing element to be collided with a surface of the piston described above by injecting at an injection speed of 80 m/s or more, and preferably 100 m/s or more, or at an injection pressure of 0.3 MPa or more, the reinforcing element improving the strength of an alloy comprising the piston when being diffused and penetrated in the alloy. In the internal combustion piston described above, oxides generated on the piston surface by casting and forging are removed by the surface treatment, and surface flaws generated on the surface are repaired, whereby the modified layer is formed with a uniformly fine-grained metal microstructure which contains the reinforcing element diffused and penetrated in the vicinity of the surface of the piston and at an alloy element of the alloy comprising the piston.

In the internal combustion piston described above, by the surface treatment using the injection powders in which an element exhibiting a photocatalytic function by oxidation, such as Ti, Sn, Zn, Zr, or W, is contained as the reinforcing element, the modified layer may be formed on a top surface of the piston, in which the reinforcing element is oxidized so that bonding quantity of oxygen is decreased as goes from the surface to the inside of the modified layer.

In addition, by injecting injection powders containing a photocatalytic element exhibiting a photocatalytic function by oxidation, together with the reinforcing element, so that the photocatalytic element is diffused and penetrated in the vicinity of the surface of the piston, a modified layer having a uniformly fine-grained metal microstructure which contains the alloy element, the reinforcing element, and the photocatalytic element may be formed on a top surface of the piston, in which the photocatalytic element is oxidized so that bonding quantity of oxygen is decreased as goes from the surface to the inside of the modified layer.

In the modified layer in which the element exhibiting a photocatalytic function by oxidation is diffused and penetrated, a noble metal element, such as silver (Ag), platinum (Pt), palladium (Pd), or gold (Au), is preferably supported.

In addition, when the internal combustion piston comprises an aluminum-silicon alloy, and the injection powders contain an Fe element as an element for improving the strength of the alloy, and also the modified layer contains silicon as the alloy element and the Fe element in the injection powders, whereby obtained a uniformly fine-grained metal microstructure.

When the aluminum-silicon alloy comprises 0.8% or less of Fe, 0.5% to 1.5% of Mg, 0.1% to 4.0% of Ni, 0.05% to 1.20% of Ti, 9% to 23% of Si, and 1% to 6% of Cu, with the rest thereof being Al, treatment using the injection powder component and nitrogen gas can be preferably performed.

In addition, in the internal combustion piston of the present invention, the modified layer comprises 1% to 10% of Fe, 11% to 25% of Si, and 0.1% to 10% of N, with the rest thereof being Al.

With the configurations of the present invention described above, according to the method for surface treatment of an internal combustion piston of the present invention and an internal combustion piston modified the surface by the above method, by using a relatively simple method such as injection of injection powders having a predetermined injection powder size on a surface of an internal combustion piston used as an object to be treated at a predetermined injection rate or at a predetermined injection pressure, oxides on the piston surface are removed, and surface flaws, such as cold shuts, generated on the surface during casting and forging are repaired. In addition, a modified surface layer having a uniformly fine-grained metal microstructure can be formed on the piston surface, the metal microstructure containing alloy elements and an element in the injection powders, which is diffused and penetrated among the alloy elements in the surface of the piston; as a result, the mechanical strength of the internal combustion piston can be significantly improved.

After the internal combustion piston is manufactured, since the mechanical strength of the piston can be improved by the subsequent step of injecting injection powders, as described above, without changing casting and forging equipment and manufacturing processes, the mechanical strength of the internal combustion piston formed by casting and/or forging using existing equipment and the like can be improved. In addition, since the alloy components and the like are not changed during casting, the mechanical strength of the internal combustion piston can be improved without causing any adverse influence on the production efficiency, such as the casting and forging properties and the workability.

Furthermore, since the surface modification of the internal combustion piston can be performed without performing heat treatment and the like thereof after the injection powders are injected, the surface treatment of the internal combustion piston can be performed in only a single step, that is, only by injecting. In addition, for example, it is not necessary to consider dimensional changes, strain, or changes in mechanical strength of the piston caused by heat treatment.

Furthermore, by virtue of the surface modification by injecting the injection powders, surface flaws, such as cold shuts, which could not be completely overcome in the past, although improvement was made to a certain extent in the casting and forging process, can be repaired. At the same time, a uniformly fine-grained metal microstructure can also be formed. In particular, the surface flaws can be completely repaired.

In addition, according to the present invention, since an element improving the strength in a high-temperature region, particularly silicon contained in the piston material at a high concentration, and powder element improving the high-temperature strength are uniformly fine-grained in an ideal manner, and in addition, since the strength is improved at the surface where fractures occur and develop, the effect of improving the strength is maintained even at high-temperature region, which are typical usage conditions for pistons.

In addition, according to the piston obtained by the method for surface treatment of the present invention for imparting a photocatalytic function to the modified surface layer, the oxidizing state of the element functioning as a photocatalyst by oxidation is changed so that bonding quantity of oxygen is decreased as goes from the surface to the inside of the piston. Even under conditions where UV is not irradiated or heat is not supplied, a modified surface layer capable of performing, for example, decomposition of organic materials and fuel modification can be obtained.

Furthermore, as described later, by injecting nitrogen gas, since the piston surface is nitrided, even though nitriding extent is very small (FIG. 7C), in particular, since silicon nitride is generated in the piston surface by a reaction between the silicon serving as a piston alloy element and nitrogen gas, a uniformly fine-grained metal microstructure is formed. Thus, a heat-resistant structural material having superior high-temperature strength and corrosion resistance and high abrasion resistance is obtained, and in particular, a significant improvement in strength can be obtained in a high-temperature region.

As a result, since a piston having the above modified surface layer formed on the top surface exhibits a photocatalytic function even under room temperature conditions in which UV is not irradiated, in an engine provided with the piston having the above modified surface layer, even when the engine is just started, that is, even when the piston is at room temperature or at a temperature close thereto, the photocatalytic function can be satisfactorily obtained. Hence, improvement in combustion efficiency can be achieved immediately after the engine is started, thereby reducing the amount of harmful substances in the exhaust gas.

According to the piston having the modified surface layer containing a metal oxide of a specific structure in the top surface, since cracking of fuel injected into a combustion chamber of an internal combustion engine is facilitated, producing lower molecular weight compounds, collision with oxygen occurs more frequently, and the combustion properties can be improved thereby, so that the fuel consumption rate can be improved. In addition, concomitant with this improvement in combustion properties, the amount of $CO_2$ exhaust gas can be reduced.

Furthermore, the number of hydrocarbons influencing the NOx reduction is increased by facilitating cracking of hydrocarbons, such as gasoline and light oil. Therefore the amount of NOx in the exhaust can be reduced by this reduction effect due to the increased number of hydrocarbons.

Furthermore, by the photocatalytic function of the above-described modified surface layer, the combustion efficiency of fuel is improved and approaches that of complete combustion, and hence, the amount of deposits generated by adhesion of carbons and the like can be reduced.

In addition, even when deposits are produced by the generation of soot and the like or by the dregs of burnt oil and the like, decomposition thereof by the photocatalytic function can be expected, and the amount of deposits can be reduced. Therefore, an engine piston having high performance over a long period of time can be provided.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Figure 1A:
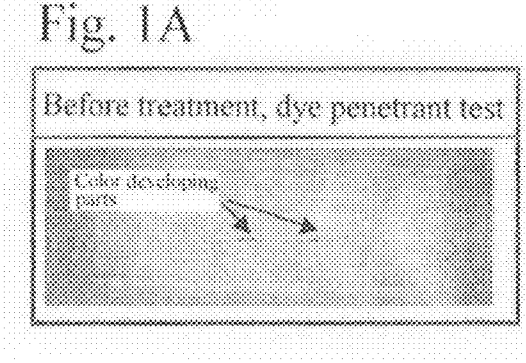
FIGS. 1A and 1B each illustrates a surface photograph of an internal combustion piston, showing results of a dye penetrant test, where FIG. 1A indicates an internal combustion piston before treatment, and FIG. 1B indicates an internal combustion piston after treatment according to the present invention.

Next, embodiments of the present invention will be described.

Surface Treatment Method

Object to be Treated (Internal Combustion Piston)

An internal combustion piston used as an object to be treated of the present invention is not particularly limited as long as it is used in internal combustion engines. For example, any type of piston, such as a piston for a gasoline engine or a piston for a diesel engine, may be used.

The internal combustion piston used as an object to be treated is a piston produced by casting and forging of an aluminum-silicon alloy.

As for the internal combustion pistons described above, the entire surface may be used as an object to be treated; however, it is not always necessary to use the entire surface of the internal combustion piston as an object to be treated, and treatment according to the method of the present invention may be performed on only a part of the surface.

When the treatment according to the method of the present invention is performed on only a part of the surface of the internal combustion piston, the surface treatment according to the method of the present invention is preferably performed on at least one of the following portions:

Portion where flaws, such as cold shuts, are generated on a surface during casting Portion where the stress is high, and strength is required Portion at which weight saving is required Casting surface of a product Portion which requires abrasion resistance and heat resistance Top surface (portion with which fuel and/or exhaust gas is brought into contact) of a piston when a photocatalytic function is imparted thereto Injection Powders The injection powders used for injection are powders which contain an element for improving the mechanical strength of the alloy comprising the internal combustion piston when being diffused and penetrated in the alloy (hereinafter, referred to as a "reinforcing element" in the present invention").

In the method for surface treatment of the present invention, in which the material for the internal combustion piston is an aluminum alloy, examples of the reinforcing element contained in the injection powders includes Fe, Mn, Zn, Ti, C, Si, Ni, Cr, W, Cu, Sn, and Zr. In consideration of the properties to be imparted to the internal combustion piston, one or more of the above elements may be contained in the injection powders.

When it is attempted to impart a photocatalytic function to the modified surface layer, an element exhibiting a photocatalytic function by oxidation is selected as the reinforcing element, or injection powders containing an element exhibiting a photocatalytic function by oxidation (referred to as a "photocatalytic element" in the present invention), besides the reinforcing element, are used.

Representative elements exhibiting a photocatalytic function by oxidation include, for example, Ti, Sn, Zn, Zr, and W, and one or more of the above elements may be contained in the injection powders.

Furthermore, when the photocatalytic function is imparted to the modified surface layer to be formed, the photocatalytic function can be improved when approximately 0.1 wt % to 10 wt % of a noble metal element (such as Pt, Pd, Ag, or Au) is included with respect to the photocatalytic element. In order to support the noble metal, for example, injection powders containing the above photocatalytic element and the noble metal element may be used, or the above noble element may be applied to the piston having a modified surface layer by injecting different injection powders containing the above noble metal element.

As one example, the relationship between the element contained in the injection powders and the effect obtained when the element is diffused and penetrated in the surface of the object to be treated is shown in the following Table 1.

TABLE 1

| | Element contained in injection powders and effects of diffusion and penetration of the element |
|---|---|
| Element Contained in Injection powders | Effects obtained by diffusion and penetration |
| [Reinforcing Element] | |
| Iron (Fe) | Improvement in Fatigue Strength |
| Nickel (Ni) | Improvement in Heat Resistance and High-Temperature Strength |
| Copper (Cu) | (In order to improve Strength, Distribution in Uniformly |
| Chromium (Cr) | Fine-Grained State is Important) |
| Manganese (Mn) | |
| Silicon (Si) | |
| Carbon (C) | |
| (Photocatalytic Element) | |
| Titanium (Ti) | Fuel Modification, and Decomposition and Removal of Deposits |
| Tin (Sn) | (Specific structure in which oxygen bonding amount is |

TABLE 1-continued

Element contained in injection powders and effects of diffusion and penetration of the element

| Element Contained in Injection powders | Effects obtained by diffusion and penetration |
|---|---|
| Zinc (Zn)<br>Zirconium (Zr)<br>Tungsten (W) | decreased from surface to the inside is formed, and catalytic function is obtained even in a dark place at room temperature.) |
| [Noble Metal Element] | |
| Silver (Ag)<br>Platinum (Pt)<br>Palladium (Pd)<br>Gold (Au), and so forth | When approximately 0.1 wt % to 10 wt % is included, photocatalytic function is improved. |

Note:
(Photocatalytic Element) is included in [Reinforcing Element], so the Effects of [Reinforcing Element] are also applied to (Photocatalytic Element).

When improvement in mechanical strength and impartment of the photocatalytic function are to be performed by a single blasting treatment, injection powders containing both the reinforcing element and the photocatalytic element may be used, or injection powders containing an element, such as Ti, Sn, Zn, Zr, or W, having properties of improving the mechanical strength of the piston alloy and properties of exhibiting a photocatalytic function by oxidation may be used. In addition, injection powders containing the reinforcing element and injection powders containing the photocatalytic element may be mixed together or may be injected separately.

In addition, after a modified surface layer is formed to obtain higher strength by injecting injection powders containing iron (Fe), nickel (Ni), copper (Cu), chromium (Cr), manganese (Mn), silicon (Si), or carbon (C) as a reinforcing element, which has no photocatalytic function by oxidation or has a small effect even when the photocatalytic function is obtained, by injecting injection powders containing titanium (Ti), tin (Sn), zinc (Zn), zirconium (Zr), tungsten (W), or the like as a photocatalytic element on the above modified surface layer, the photocatalytic function may be imparted thereto.

For example, when the reinforcing element and the photocatalytic element are each a metal, the injection powders described above may be formed of a pure metal of the element or may be formed of an alloy containing the metal.

The average particle diameters of the injection powders to be used is within a range from 20 μm to 400 μm. The reason the particle diameter of the injection powders is limited to the above range is that, when the particle diameter of the injection powders is less than 20 μm or more than 400 μm, even when the injection powders are brought to be collided with the surface of an internal combustion piston by injecting, the element in the injection powders cannot be diffused and penetrated in the piston surface.

The reason why the element in the injection powders cannot be diffused and penetrated in the piston surface when the injection powder having a diameter beyond the above range is not clearly understood. However, it is through that, when the particle diameter is less than 20 μm, since the mass is excessively small, sufficient heat generation necessary at the collided portion cannot be obtained, and when the particle diameter is more than 400 μm, since a predetermined injection rate cannot be obtained, or heat generated in collision is widely diffused, in both cases, a local increase in temperature necessary for modification elements in the injection powders to be diffused and penetrated cannot be obtained.

Unlike the invention disclosed in Japanese Patent KOKAI (LOPI) No. H5-86443 described as a related art in which the injection powders are mixed with other injection powders, such as shots (such as steel balls having a particle diameter of 400 μm) for shot blasting, the injection powders described above are separately injected.

Conditions for Injection

The injection powders described above are injected on the above internal combustion piston used as an object to be treated at an injection speed of 80 m/s or more or an injection pressure of 0.3 MPa or more, and at an arc height amount of 0.1 N or more.

Various known blast machines and shot peening devices may be used as the device for this injection.

In addition, a direct pressure type, a suction type, and other injecting types may be used as the injection device; however, in this embodiment, as one example, the injection device of the direct pressure type is used.

The propellant used for injection is compressed gas, and as one example of the compressed gas, compressed air or compressed nitrogen may be used.

For example, in the direct pressure type, after injected abrasives in the form of powder and dust are separated in a recovery tank, the dust is sent to a dust collector provided with an exhaust fan via a duct, and the abrasive falls in the recovery tank and is stored at a lower portion thereof. At the lower portion of the recovery tank, a pressurized tank is provided with a dump valve interposed therebetween, and when there is no longer any abrasive in the pressurized tank, the dump valve is lowered, so that the powdered abrasive in the recovery tank is supplied to the pressurized tank. When the powder is supplied to the pressurized tank, since compressed gas is fed into this tank, and at the same time, the dump valve is closed, the pressure inside the tank is increased, and as a result, the powder is pushed out from a supply port provided at the bottom of the tank. For example, compressed nitrogen gas contained in a compressed gas cylinder is supplied to the supply port as compressed gas separately used as a reactive injection gas, and the powder is transported to a nozzle via a hose, so that the powder is injected from a nozzle tip together with the above gas at high velocity.

In a suction-type blast machine, when compressed gas used as a reactive injection gas is injected inside an injection nozzle for suction via a hose communicating with a compressed gas supply source, the inside of the nozzle has a negative pressure, then the powders in the tank is sucked into the nozzle via a hose used for abrasive due to the negative pressure, then injected from the nozzle tip.

In addition, instead of the above compressed air or compressed nitrogen, compressed low-temperature nitrogen gas may also be used, and when nitrogen gas is used as such, low-temperature gas, such as nitrogen gas passing through a cooling medium, or nitrogen gas at a temperature of 0° C. or less obtained by vaporizing liquid nitrogen, may be used as the low-temperature nitrogen gas. In this embodiment, nitrogen, which can be obtained at a reasonable cost by removing oxygen from liquid air, or in particular, vaporized gas of liquid nitrogen, from which gas at a low temperature of 0° C. or less can be easily obtained by vaporization, is used.

By the blasting treatment, a mixed fluid comprising the injection powders and nitrogen gas can be injected on the piston surface, and a nitride compound formed by a chemical reaction of the nitrogen gas with the injection powders and a piston having a nitrogen reactive component, such as aluminum, silicon, or iron, can be diffused and penetrated in the surface of the piston. In addition, even when dust is generated, for example, by injection of injection powders and collision between the injection powders and the piston, the probability of dust explosion and the like can be reduced.

Operation

As described above, when the injection powders are brought to be collided with the surface of the internal combustion piston, serving as an object to be treated, by injecting at an injection speed of 80 m/s or more or at an injection pressure of 0.3 MPa or more, the velocity of the injection powders is changed before and after the collision with the surface.

In consideration of the law of conservation of energy, a part of the energy corresponding to this change in velocity at collision as a grinding force on the piston surface, and hence surface oxides, such as oxides at cold shuts and the like generated in casting, are removed.

In addition, the other part of the energy generated at collision deforms collided portions of a surface of the metal product, and thermal energy is generated by internal friction caused by this deformation.

By repeated local heating and cooling of the piston surface by this thermal energy, minute surface flaws, such as cold shuts described above, generated on the piston surface are repaired. In addition, an alloy component in the vicinity of the surface of the piston is recrystallized thereby fine-grained.

Furthermore, besides the local temperature increase on the piston surface caused by the above thermal energy, a temperature increase similar to that described above also occurs in the injection powders, and an element in the injection powders thus heated undergoes adsorption on the piston surface which is locally heated, so that the element, in a fine-grained state, is diffused and penetrated in the piston surface.

As described above, in the internal combustion piston treated by the surface treatment method according to the present invention, the minute surface flaws, such as cold shuts, generated on the surface are repaired, and in addition, the element in the injection powders is diffused and penetrated in the piston from the surface thereof to a depth of approximately 20 μm and is dispersed in a fine-grained state among the alloy elements of the alloy comprising the piston, so that a modified surface layer is formed which has a uniformly fine-grained metal microstructure containing the above elements.

Since the surface flaws are repaired and regenerated as described above, stress concentration at the surface flaw portions does not occur, and since the modified surface layer is formed on the treated surface, an increase in strength of the internal combustion piston is realized.

In addition, in general, it has been known that in a cast aluminum alloy, iron makes a compound such as Al—Fe—Si coarser and degrades the toughness and corrosion resistance thereof, however, concomitant with the formation of the fine-grained microstructure described above, the abrasion resistance and the high-temperature strength are improved. In addition, in a copper alloy, Ni forms Al—Cu—Ni, and the high-temperature strength is improved.

When low-temperature nitrogen gas is used as compressed gas, by supplying nitrogen as compressed gas using a nitrogen bottle as a compressed gas supply source, injection powders are pressure-fed together with nitrogen to an injection nozzle and are then injected to the piston, which is placed in a cabinet.

For example, injection powders to be pressure-fed by low-temperature nitrogen gas at a pressure of 0.6 MPa and a temperature of 0° C. are appropriately mixed therewith and are then injected from a nozzle to the piston surface at a pressure of 0.6 MPa, a compressed gas temperature of 0° C., and a injection distance of 200 mm.

As described above, during a surface strengthening heat treatment by shot peening, since the piston surface is rapidly cooled to room temperature, surface strengthening, such as improvement in hardness and the effects of preventing aging deformation and secular deformation, can also be performed on the piston, which is a non-ferrous metal and has a low recrystallization temperature. In addition, when the low-temperature compressed gas is injected together with injection powders to the piston surface which is heated to a high temperature, such as the recrystallization temperature or more, by injecting the injection powders, a local surface area of the metal product injected with this nitrogen gas is rapidly cooled from the high temperature, such as the recrystallization temperature or more, due to collision with the injected injection powders to room temperature or less, and the microstructure of the metal product at the surface portion thereof is preferably fine-grained, so that the mechanical strength can be increased, and the aging deformation and/or the secular deformation can be prevented. That is, in the embodiment of the present invention, because of the low temperature of the nitrogen gas, since the metal is not liable to be deformed, and sliding between grain boundaries is not liable to occur, energy generated by the collision with the injection powders is not absorbed, and the temperature at the surface becomes high; hence, as a result, by rapid heating and rapid cooling, the microstructure can be fine-grained and can have a higher density.

When the injection powders contain a nitrogen reactive component, such as Cr or Mo, besides Al, the piston surface is nitrided. In particular, when silicon nitride is formed on the piston surface by reaction of nitride gas with silicon, which is a piston alloy element, or more particularly, when silicon nitride is formed by reaction of nitrogen gas with silicon at a high concentration, the microstructure is uniformly fine-grained.

It is known that silicon nitride, a non-oxide ceramic, is a heat resistant structural material having a high-temperature strength, superior high-temperature corrosion resistance, and high abrasion resistance, and in a high temperature region in which the piston of the present invention is used, significant improvement in strength can be obtained.

When injection of the injection powders is performed not only for improving mechanical strength of the piston but also for imparting a photocatalytic function to the formed modified surface layer, injection powders containing a photocatalytic element as well as the above-described reinforcing element may be used, or injection powders containing an element, such as Ti, Sn, Zn, Zr, or W, which functions as a reinforcing element as well as a photocatalytic element, may also be used. Furthermore, a mixture of injection powders containing a reinforcing element and injection powders containing a photocatalytic element may be injected on a piston used for engines.

In addition, before or after the injection powders containing a reinforcing element are injected on the internal combustion piston used as an object to be treated, the injection powders containing a photocatalytic element may be injected. Furthermore, for example, the injection powders containing a reinforcing element and the injection powders containing a photocatalytic element may be simultaneously injected by using two blast machines.

When the photocatalytic element contained in injection powders is diffused and penetrated in the piston surface as described above, it is oxidized by reaction, for example, with oxygen in the compressed air used for injection or oxygen in ambient air and is then diffused and penetrated in the vicinity of the piston surface.

The oxidation state of the photocatalytic element is not uniform in the modified surface layer to be formed but has a structure in which bonding with oxygen is reduced from the surface of the modified layer to the inside of the modified layer.

The modified layer containing the photocatalytic element bonded with oxygen in an unstable state as described above exhibits a photocatalytic function without UV irradiation, even at room temperature.

EXAMPLES

Next, experimental examples of surface treatment by the method according to the present invention will be described.

Confirmation Test for Repair of Surface Flaws and Formation of Modified Layer

Purpose of Experiment

By performing surface treatment of the method according to the present invention, it is confirmed whether surface flaws of an internal combustion piston can be repaired, and whether a modified surface layer can be formed from the surface thereof to a predetermined depth.

Experimental Method

By using materials shown in Table 4 below, injection powders were injected on an Al—Si composition (internal combustion piston) shown in Table 2 under the treatment conditions shown in Table 3.

TABLE 2

Figure 10:
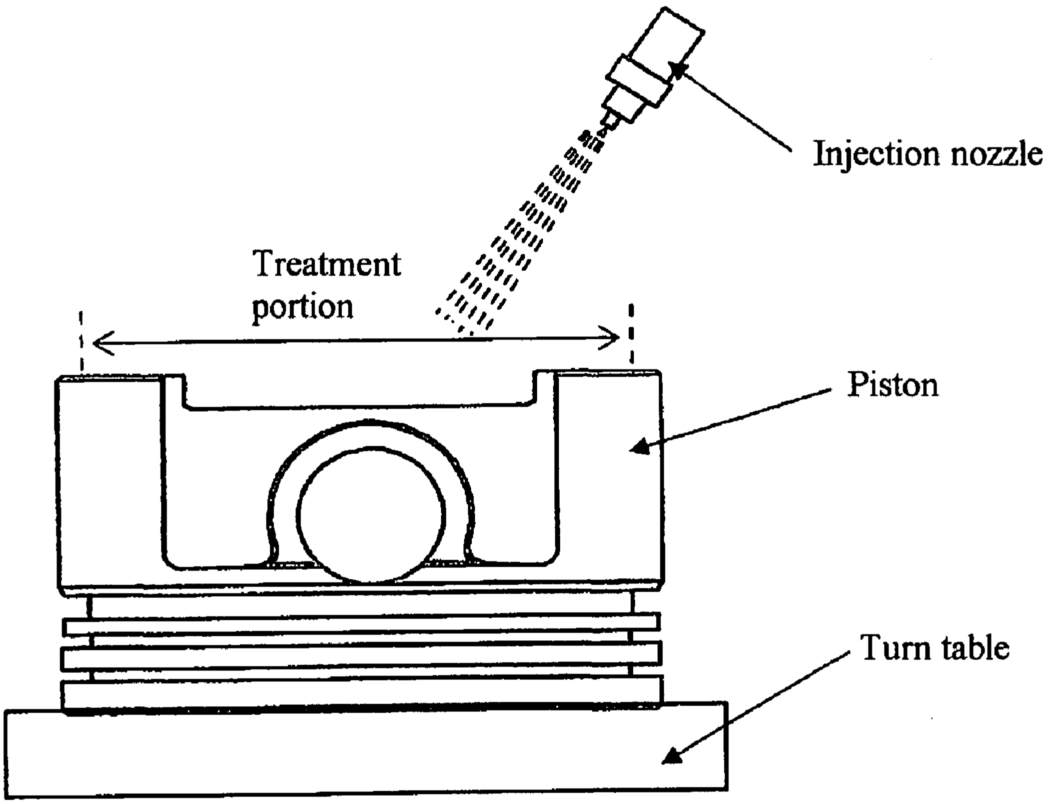
FIG. 10 is a view illustrating a method for injecting injection powders in a confirmation test in which repair of surface flaws and formation of a modified layer are confirmed.

| Object to be treated | |
|---|---|
| Object to be treated | Piston for a gasoline engine |
| Material | Table 4 (Al-12% Si, and others) |
| Treatment portion | See FIG. 10 |
| Area of treatment portion | Approximately 80 mm in diameter, Entire inner surface |

TABLE 3

| Treatment conditions | |
|---|---|
| Injection powders | Material: High-speed tool steel (primary component: Fe)<br>Particle diameter: Average value of approximately 50 μm<br>Shape: Spherical or polygonal shape |
| Injection method | Injection fluid: Compressed air, Injection pressure: 0.6 MPa |
| Treatment method | As shown in Table 10, a piston for a gasoline engine as an object to be treated is placed on a turntable, and while the turntable is rotated, injection powders are injected for 30 seconds. |

TABLE 4

Elements added to or injected on aluminum-silicon alloy of the present invention, and the effects thereof

| Added or injected element | Alloy content (%) | Effect of addition and effect of diffusion and penetration by injection |
|---|---|---|
| Si | 9 to 23 | 1. Improvement in casting properties (fluidity).<br>2. Improvement in abrasion resistance.<br>3. Decrease in coefficient of thermal expansion.<br>4. Improvement in strength. |
| Cu | 1 to 6 | 1. Improvement in strength from room temperature to high temperature (approximately 250° C.).<br>2. Degradation in cutting properties due to crystallization of $Al_2Cu$ (θ phase).<br>3. Crystallization of coarse $Al_2Cu$ in a high-temperature region of more than 250° C. causes degradation in high-temperature fatigue strength (improved by Effect No. 1. of Ni shown below). |
| Mg | 0.5 to 1.5 | 1. $Mg_2Si$ is separated out by heat treatment with Si, and strength is improved. |
| Ni | 0.1 to 4.0 | 1. $Al_3(Ni, Cu)_2$ is formed with Cu, and strength in a high-temperature region more than 250° C. is improved.<br>2. The improvement in strength is that separation of coarse $Al_2Cu$ in a high-temperature region of more than 250° C. is prevented, and thereby degradation in high-temperature fatigue strength is prevented. |
| V | 0.05 to 0.20 | 1. Improvement in heat resistance. |
| Ti | 0.05 to 0.20 | 1. Improvement in strength by crystallized fine-grained microstructure.<br>2. Degradation in strength by crystallization of $TiAl_3$ plate shaped crystal caused by excessive addition. |

TABLE 4-continued

Elements added to or injected on aluminum-silicon alloy of the present invention, and the effects thereof

| Added or injected element | Alloy content (%) | Effect of addition and effect of diffusion and penetration by injection |
|---|---|---|
| Na | 10 ppm to 100 ppm | 1. Improvement in ductility by improvement in eutectic Si crystals.<br>2. Maintenance of hypoeutectic texture. |
| P | 30 ppm to 150 ppm | 1. Improvement in strength by fine-grained primary Si crystals.<br>2. Maintenance of hypereutectic texture. |
| Fe | up to 0.8 | 1. Although addition is effective in improving high-temperature strength in some cases, when content is increased, plate shaped crystals ($FeAl_3$) are formed, and strength and elongation are degraded.<br>2. To overcome item No. 1 above, it is attempted to change the plate shape to a cluster shape by addition of Mn. |

The rest of the element is aluminum

Experimental Results

Confirmation of Repair State of Surface Flaws

Dye Penetrant Evaluation

After a dye was applied to the surface of the piston for a gasoline engine used as an object to be tested, the dye was removed by washing, and the color development of the dye remaining in flaws (recesses of cold shuts) on the piston surface was confirmed, thus performing a dye penetrant test for checking the presence of the flaws on the piston surface.

Figure 1B:
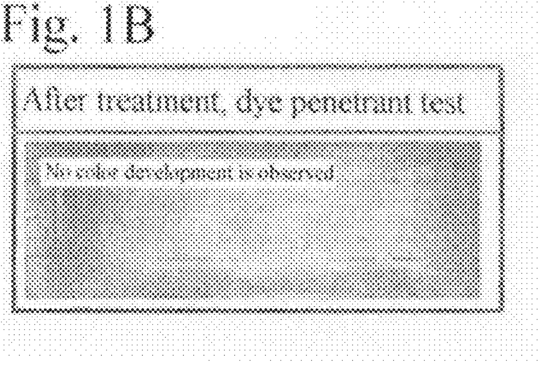

As shown in FIG. 1A, although the presence of minute flaws (cold shuts) was observed on the untreated piston surface by dye color development, after the surface treatment method of the present invention was performed, the evaluation was again performed by a similar dye penetrant test. As a result, it was confirmed that, as shown in FIG. 1B, dye color development was not observed, and the minute flaws (cold shuts) present on the surface were completely repaired.

Confirmation Using Scanning Electron Microscope (SEM)

Figure 2A:
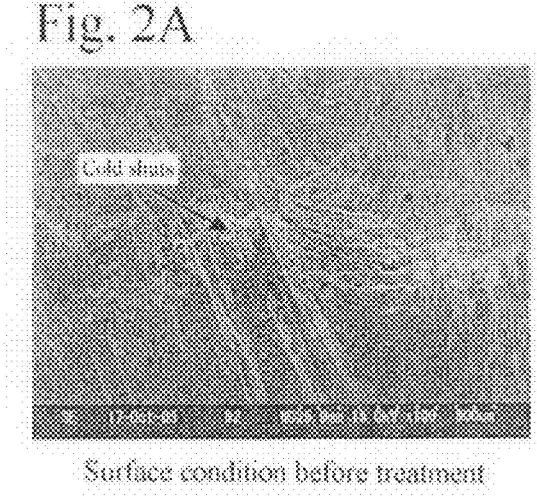
FIGS. 2A and 2B each illustrates scanning electron microscope image showing a state of generation of surface flaw, where FIG. 2A indicates the state before treatment, and FIG. 2B indicates the state after the treatment according to the present invention.
Figure 2B:
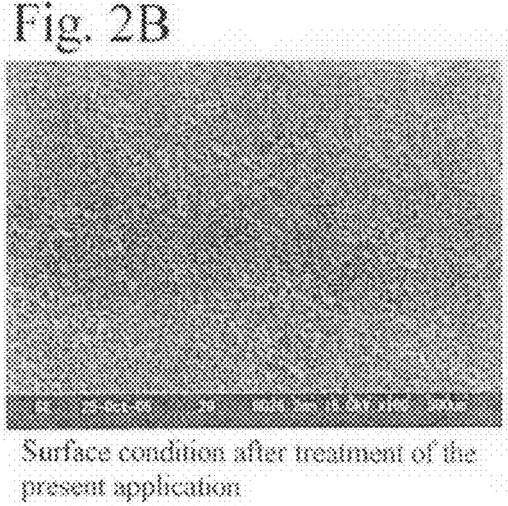

In addition, according to the observation results of the state of the piston surface before and after the surface treatment of the present invention using SEM images, although numerous flaws (cold shuts) were observed on the untreated piston surface, as shown in FIG. 2A, the minute flaws (cold shuts) on the piston treated by the surface treatment method of the present invention disappeared, as shown in FIG. 2B.

Confirmation of Formation of Modified Surface Layer

Figure 3:
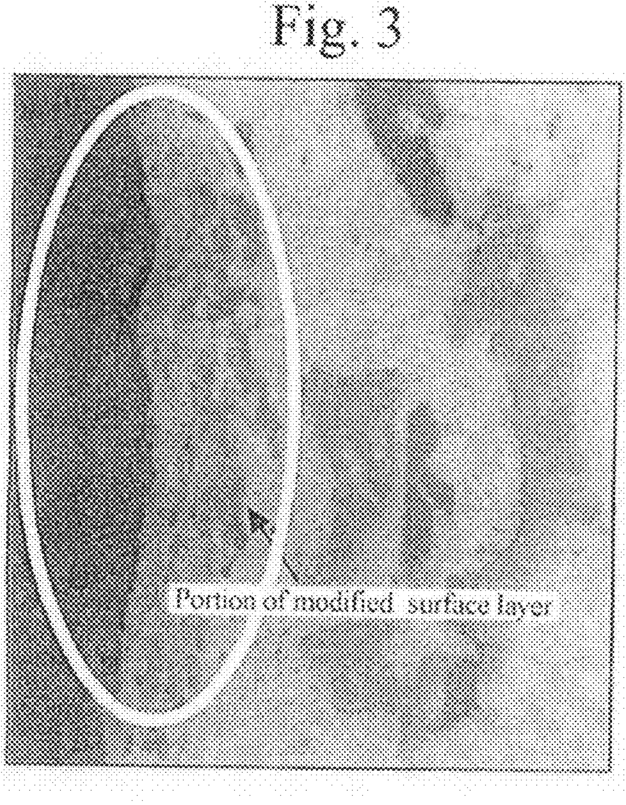
FIG. 3 is a metallurgical microscope image showing a cross-section of a piston after the treatment according to the present invention.
Figure 4:
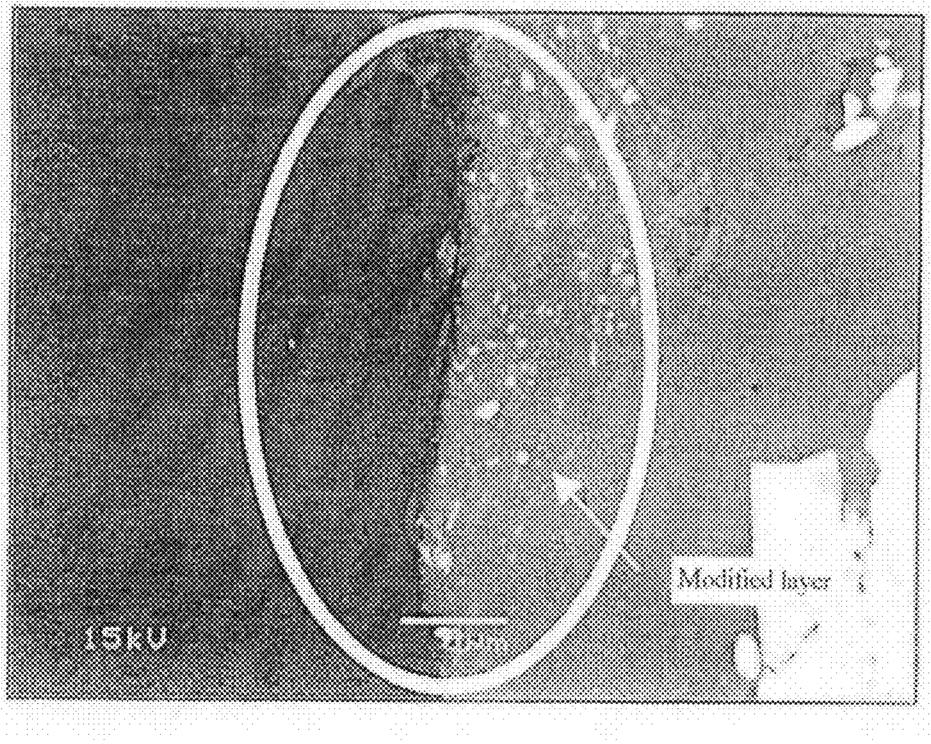
FIG. 4 is a scanning electron microscope image showing a cross-section of a piston after the treatment according to the present invention.

After the method for surface treatment according to the present invention was performed, a modified surface portion of the piston was cut out, and a cross-section thereof was observed. The result observed by a metallurgical microscope is shown in FIG. 3, an SEM image is shown in FIG. 4, and results of energy dispersive qualitative surface analysis using an SEM are shown in FIGS. 5A to 5D.

In all the results described above, it was confirmed that the modified surface layer was formed at a surface layer portion from the surface of the piston to a depth of approximately 20 μm.

As is apparent from FIGS. 5A to 5D, in this modified surface layer, Fe, an element of the injection powders, and Si contained as an alloy element in the alloy comprising the piston were present in a fine-grained state in an aluminum component. As a result, the metal microstructure containing the above elements was uniformly fine-grained.

Figure 5A:
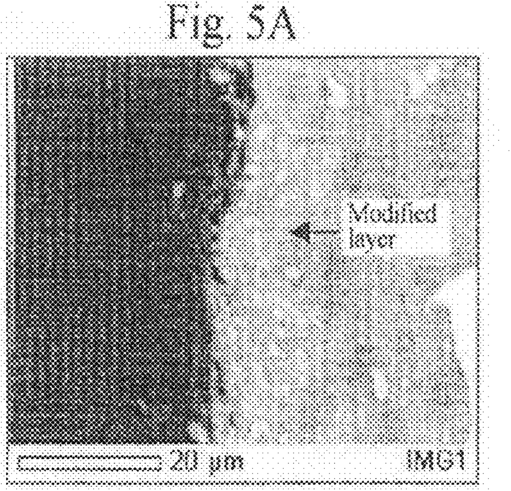
FIGS. 5A to 5D each illustrates an energy dispersive x-ray spectroscopy image obtained by a scanning electron microscope showing a cross-sectional portion of a piston after the treatment according to the present invention, where FIG. 5A indicates a surface analysis image of a modified layer composition, FIG. 5B indicates a surface analysis image of an Al component, FIG. 5C indicates a surface analysis image of an Si component, and FIG. 5D indicates a surface analysis image of an Fe component.
Figure 5B:
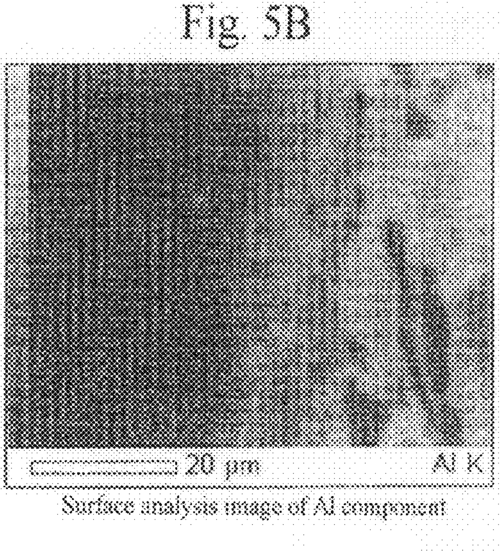
Figure 5C:
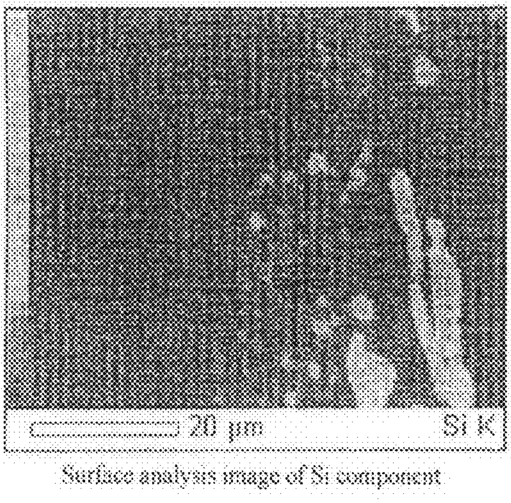
Figure 5D:
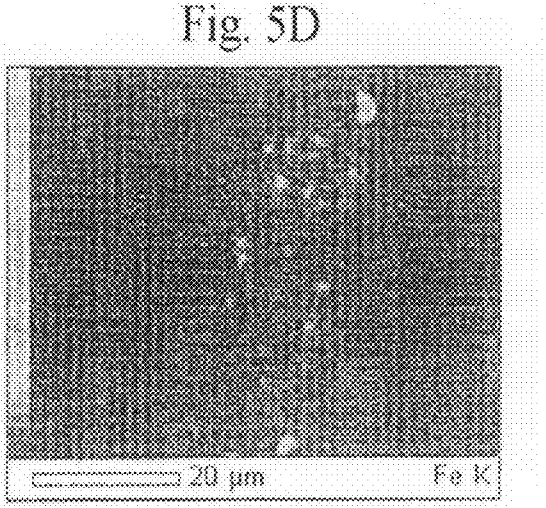
Figure 6A:
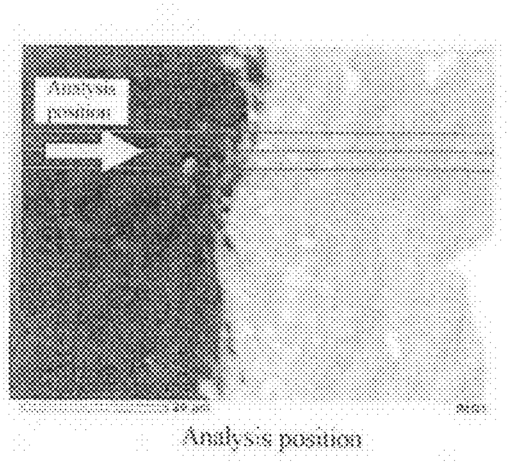
FIGS. 6A to 6D are Si, Al, and Fe analysis results by line scanning of the cross-section of the piston after the treatment according to the present invention shown in FIG. 5A, where FIG. 6A indicates an analysis position, FIG. 6B indicates an Si line analysis graph, FIG. 6C indicates an Al line analysis graph, and FIG. 6D indicates an Fe line analysis graph.
Figure 6B:
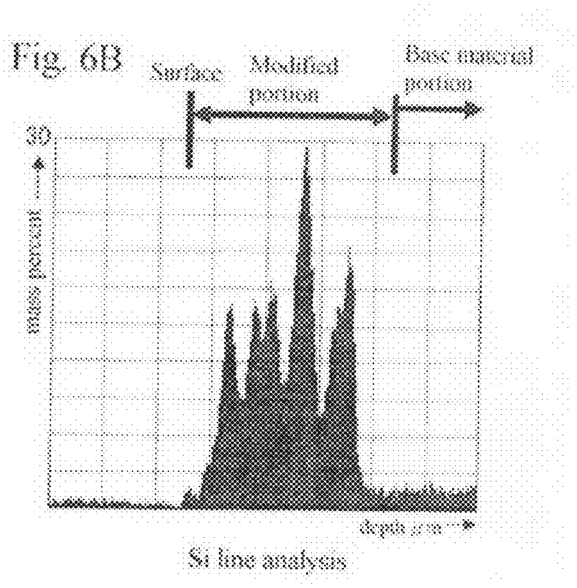
Figure 6C:
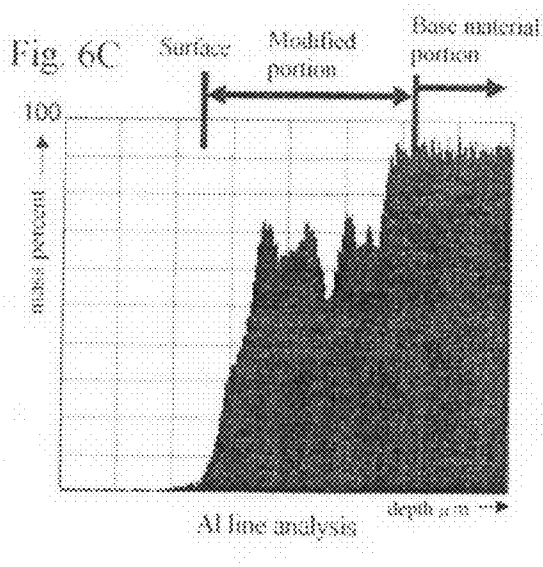
Figure 6D:
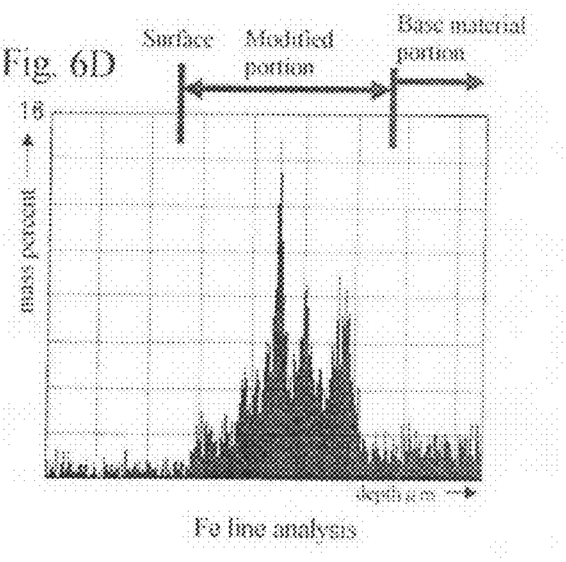

As shown in FIGS. 6A to 6D, Si, Al, and Fe analyses were performed by line scanning from the surface of cross-section of the piston treated according to the present invention shown in FIG. 5A. According to the results, in the portion of the modified layer, Si and Fe had a high concentration, and the concentration of Al was decreased. In the modified portion, the Si element formed agglomerates, and the agglomerates were uniformly dispersed. In addition, in the modified portion, the Fe element had a higher concentration than that of a base material and was uniformly fine-grained and dispersed.

In the case in which a mixed fluid is injected by using compressed nitrogen gas, when the piston is made of a metal material always containing Al, which is a nitrogen reactive component, and also containing Si, Cr, Ti. or the like, and when the injection powders are made of a metal similar thereto, a nitride layer, such as $Si_3N_4$, TiN, VN, AlN, or CrN, is formed on the piston surface by diffusion and penetration, and at the same time, a nitride is also generated in a surface coat formed by the injected injection powders. When the piston surface is the same as described above, and the injection powders are made, for example, of a ceramic having no nitrogen reactive component, a nitride is formed only on the piston surface. When the piston and the injection powders both have nitrogen reactive components, nitrides are formed on the piston surface and the coat. In particular, silicon nitride has superior high-temperature corrosion resistance and high-temperature strength as a heat-resistant structural material and, in addition, forms a modified layer having superior abrasion resistance.

In addition, also in the following case, film formation can be performed by injection of injection powders. That is, when the piston is made of a metal material containing Ti, Al, Cr, or the like or a mixture of the above metal and a ceramic, and when the injection powders are formed of the same material as that for the piston material, nitrides are formed on both the piston and the coat.

That is, when only the piston contains a nitride reactive component, a nitride is formed on the piston surface.

Figure 7A:
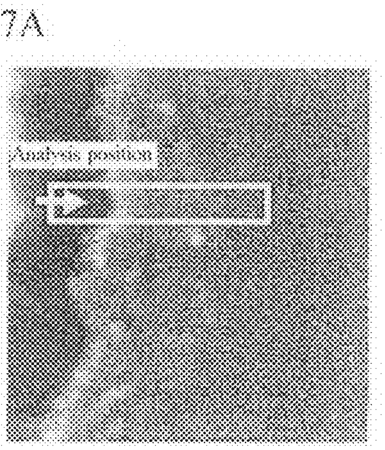
FIGS. 7A to 7C illustrate a surface modification effect obtained by injection using nitrogen gas, according to the present invention, where FIG. 7A indicates an analysis position, FIG. 7B indicates an Si line analysis graph, and FIG. 7C indicates an N line analysis graph.
Figure 7B:
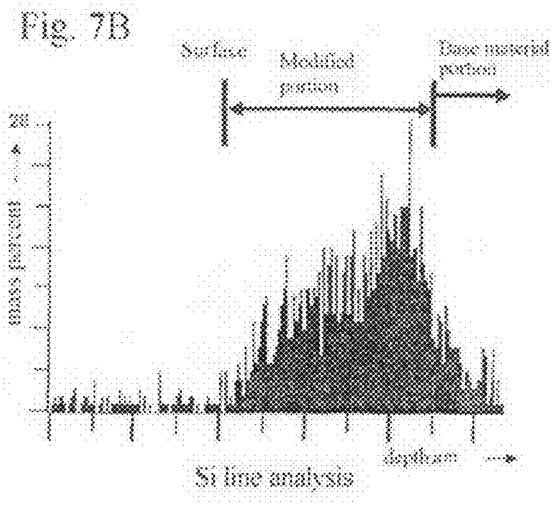
Figure 7C:
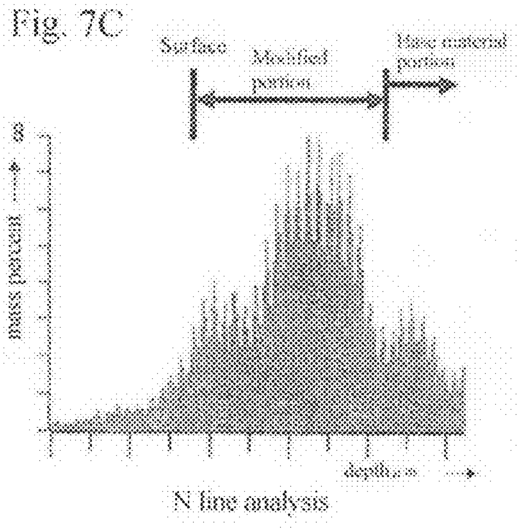

As shown in FIG. 7C, as a result of a surface modification effect by injecting using nitrogen gas, nitrogen is detected in a modified portion inside the surface. Hence, nitridation of the alloy elements, that is, the formation of aluminum nitride, silicon nitride and the like, is observed, and in particular, nitridation of an Fe component is observed.

Confirmation Test of Fatigue Strength and Tensile Strength

Purpose of Experiment

By performing the surface treatment method according to the present invention, it is confirmed whether the fatigue strength and the tensile strength of a metal product used as an object to be treated are improved.

Test Method

The test method and test conditions were as follows.

Test Piece

Figure 11:
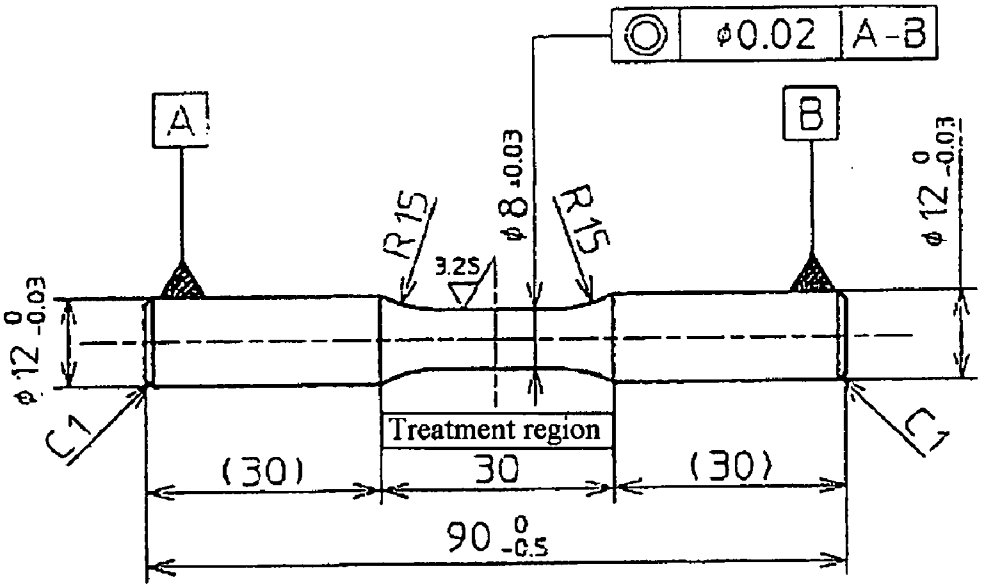
FIG. 11 is a view illustrating a test piece for a fatigue test.
Figure 12:
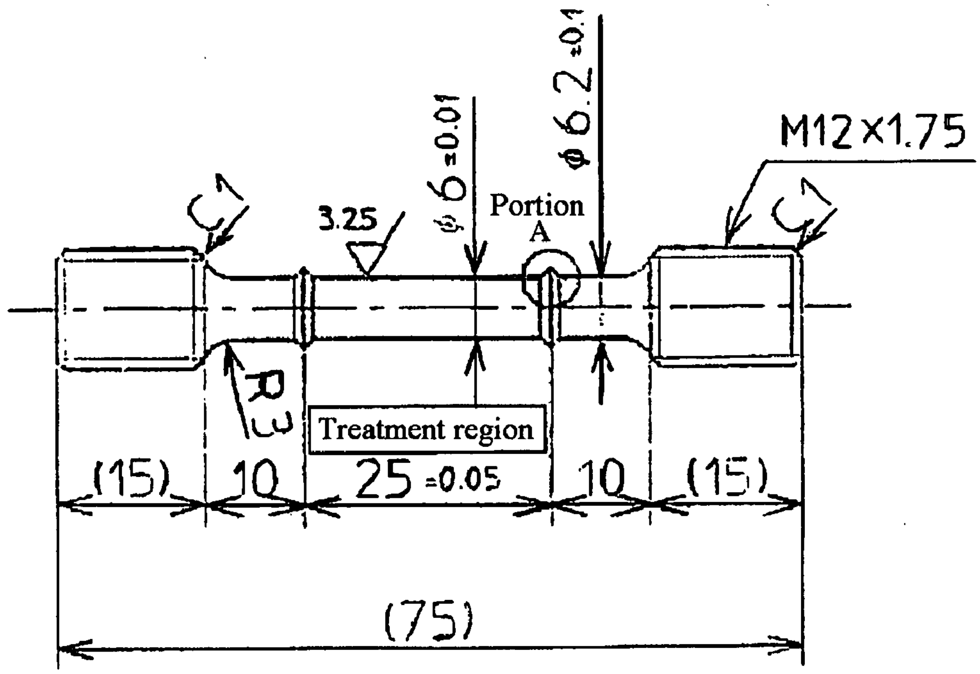
FIG. 12 is a view illustrating a test piece for a tensile test.

The shape and the size of test pieces used for the fatigue test and those for the tensile strength test are shown in FIGS. 11 and 12, respectively.

Test Conditions

Fatigue Test

The fatigue test was performed for a test piece treated by the surface treatment method according to the present invention (example) and an untreated test piece (comparative example) in a treatment region shown by an arrow in FIG. 11.

The injection powders and injecting method used for the surface modification of the example were the same as shown in Table 3, and the injection powders were injected for 30 seconds while the test piece shown in FIG. 11 was rotated around the axis.

For the test piece treated by the surface treatment method according to the present invention, as described above, and the untreated test piece, measurement of the fatigue strength was performed at room temperature (25° C.) and a high temperature (250° C.) respectively.

Tensile Test

The tensile test was performed for a test piece treated by the surface treatment method according to the present invention in a treatment region shown by an arrow in FIG. 12 (example) and an untreated test piece (comparative example).

The injection powders and injection fluid used for the surface modification of the example were the same as shown in Table 3, and the injection powders were injected for 30 seconds while the test piece shown in FIG. 12 was rotated around the axis thereof.

For the test piece treated by the surface treatment method according to the present invention, as described above, and the untreated test piece, measurement of the tensile strength was performed at room temperature (25° C.) and a high temperature (250° C.) respectively.

Test Results

Fatigue Test

Figure 8:
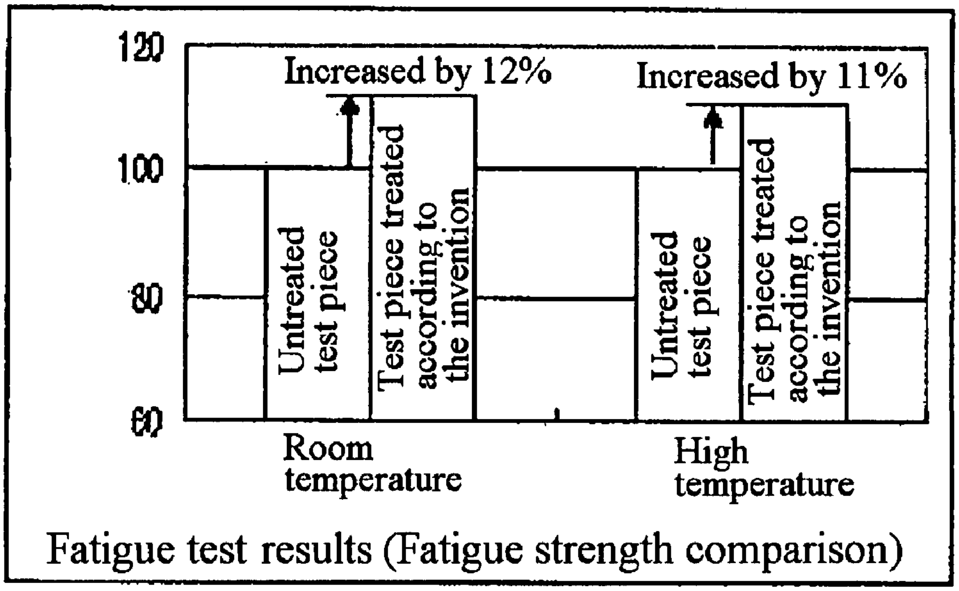
FIG. 8 is a graph showing test results of a fatigue test.

According to the results of the above fatigue test, it was confirmed that the test piece treated by the surface treatment of the present invention was improved with respect to that of the untreated test piece by 12% at room temperature and by 11% at a high temperature, in terms of the amplitude stress (number of amplitude cycles: $10^8$·−3σ value) (see FIG. 8).

This indicates that the strength in a high temperature region in which the piston is to be used is improved by 10% or more.

Tensile Test

Figure 9:
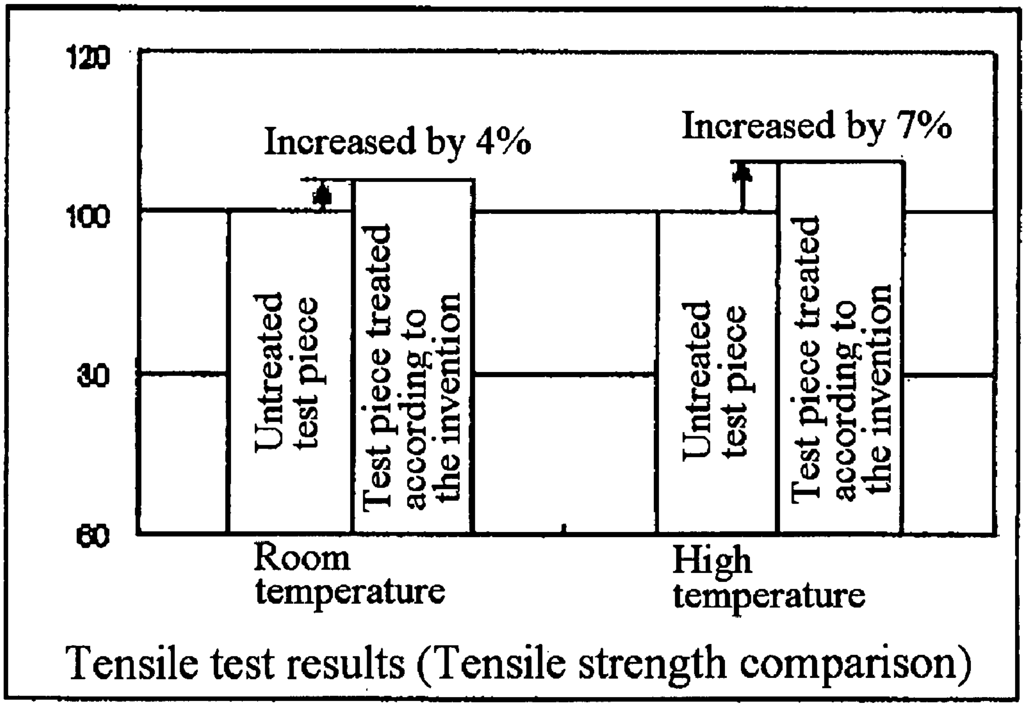
FIG. 9 is a graph showing test results of a tensile test.

According to the results of the above tensile test, it was confirmed that the test piece treated by the surface treatment of the present invention was improved with respect to that of the untreated test piece by 4% at room temperature and by 7% at a high temperature, in terms of the tensile strength (−3σ value) (see FIG. 9).

Components of Modified Layer

The component distribution of a modified layer obtained by injecting high-speed tool steel powders using nitrogen gas was as follows.

TABLE 5

| Components in modified portion treated by high-speed tool steel powders (with nitrogen) | | | |
|---|---|---|---|
| Fe | Si | N | Al |
| 1% to 10% | 11% to 25% | 0.1% to 10% | The rest of the components |

Confirmation Test of Photocatalytic Effect

Purpose of Experiment

It is confirmed whether a modified surface layer formed by injecting injection powders containing an element exhibiting a photocatalytic function by oxidation exhibits a fuel modification effect without UV irradiation and in a room-temperature atmosphere.

Experimental Method

Injection powders containing titanium, tin, or zinc, i.e., the reinforcing element described above as well as an element exhibiting a photocatalytic function by oxidation, were injected on a top surface of the internal combustion piston shown in Table 6, so that a modified surface layer was formed.

The injection powders used in this experiment were the same as shown in Table 7, and the treatment was performed under the conditions shown in Table 8.

TABLE 6

Figure 13A:
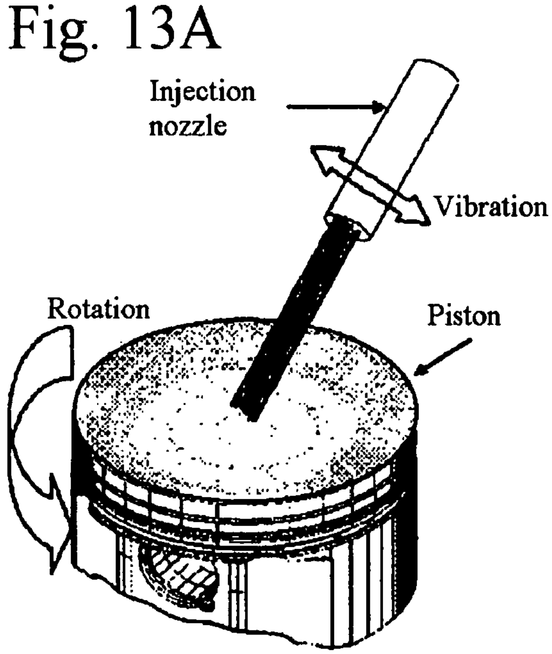
FIGS. 13A and 13B are views illustrating a confirmation test in which a photocatalytic function is confirmed, where FIG. 13A indicates a method for injecting injection powders, and FIG. 13B indicates a treatment portion.
Figure 13B:
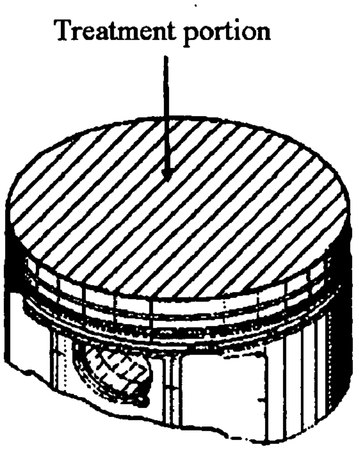

| Object to be treated | |
|---|---|
| Object to be treated | Piston for gasoline engine |
| Material | Al—12% Si (see Table 3) |
| Treatment Portion | See oblique line portion in FIG. 13B |
| Area of treatment portion | Approximately 85 mm in diameter of top surface |

TABLE 7

| Injection powders | |
|---|---|
| Titanium-based injection powders | Material: Mixture of approximately 90% Ti (purity: 99.5% or more) and 10% Ag<br>Particle diameter: Average value of approximately 50 μm<br>Shape: Spherical or polygonal shape |
| Tin-based injection powders | Material: Mixture of approximately 90% Sn (purity: 99.5% or more) and 10% Ag<br>Particle diameter: Average value of approximately 50 μm<br>Shape: Spherical or polygonal shape |
| Zinc-based injection powders | Material: Mixture of approximately 90% Zn (purity: 99.5% or more) and 10% Ag<br>Particle diameter: Average value of approximately 50 μm<br>Shape: Spherical or polygona shape |

TABLE 8

| Treatment Conditions (common to all injection powders) | |
|---|---|
| Injection Method | Injection fluid: Compressed nitrogen, Injection pressure: 0.4 MPa |
| Treatment Method | As shown in FIG. 13A, injection powders were injected for 60 seconds while a piston for a gasoline engine used as an object to be treated was rotated and an injection nozzle was vibrated. |

Test Result

Confirmation of Formation of Modified Surface Layer

Results Using Titanium-Based Injection Powders

Surface analysis of a cross-sectional portion obtained by cutting the piston for a gasoline engine injected with the above titanium-based injection powders was performed by SEM-EDX, and the results are shown in FIGS. 14A to 14E. The results of a line analysis of the above cross-sectional view are shown in FIGS. 15A to 15E respectively.

From the above analytical results, it was confirmed that a uniformly fine-grained modified surface layer was formed by diffusion and penetration of the titanium component from a surface of the piston (Al) to the inside.

This modified surface layer had a composition in which an Si component in an aluminum base material was also present in a fine-grained state (FIG. 14C), and the strength was increased.

Figure 14A:
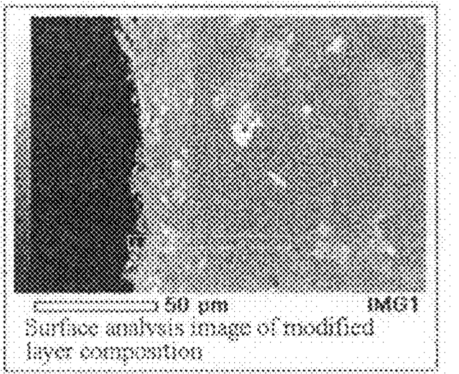
FIGS. 14A to 14E each illustrates an energy dispersive x-ray spectroscopy image obtained by a scanning electron microscope showing a cross-sectional portion of a piston injected with injection powders containing titanium according to the present invention, where FIG. 14A indicates a surface analysis image of a modified layer composition, FIG. 14B indicates a surface analysis image of an Al component, FIG. 14C indicates a surface analysis image of an Si component, FIG. 14D indicates a surface analysis image of a Ti component, and FIG. 14E indicates a surface analysis image of an O component.
Figure 14B:
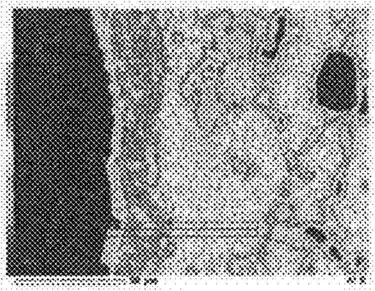
Figure 14C:
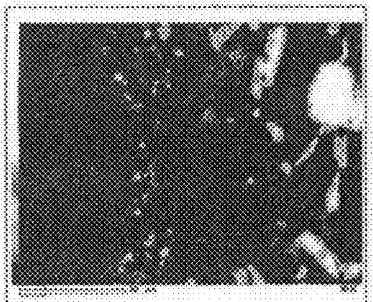
Figure 14D:
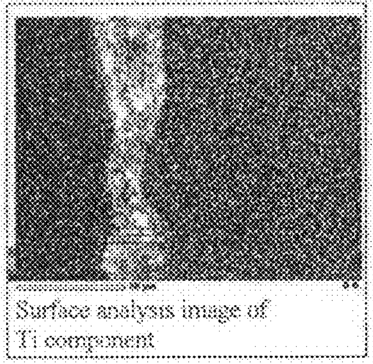
Figure 14E:
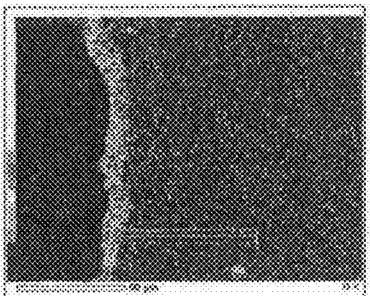
Figure 15A:
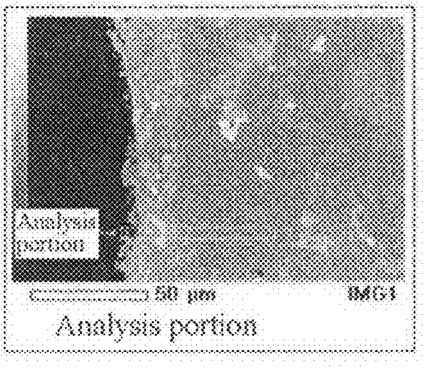
FIGS. 15A to 15E are Al, Si, Ti, and O analysis results by line scanning of the cross-sectional portion of the piston after the treatment according to the present invention shown in FIG. 14A, where FIG. 15A indicates an analysis position, FIG. 15B indicates an Al line analysis graph, FIG. 15C indicates an Si line analysis graph, FIG. 15D indicates a Ti line analysis graph, and FIG. 15E indicates an O line analysis graph.
Figure 15B:
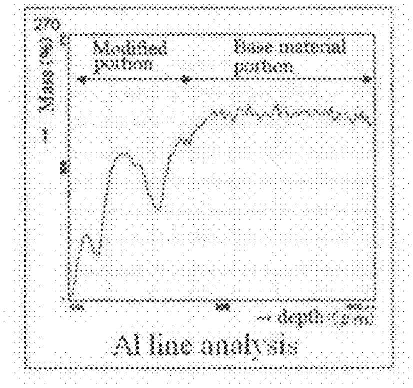
Figure 15C:
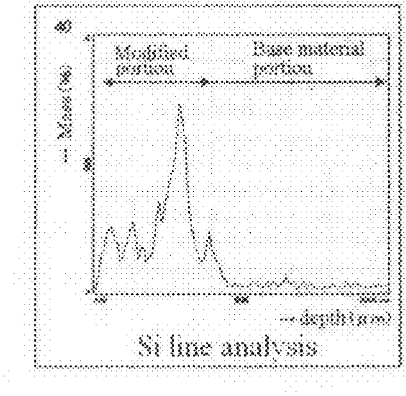
Figure 15D:
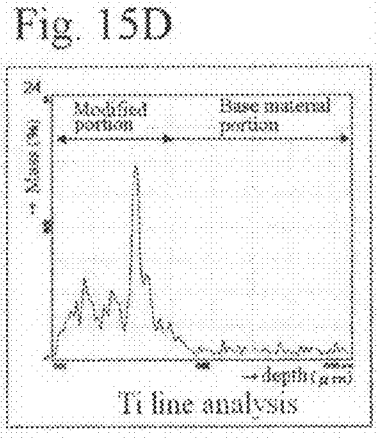
Figure 15E:
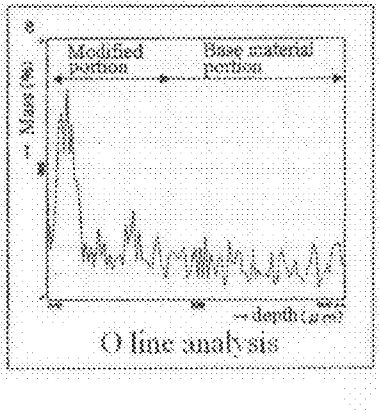

From the analytical results by SEM-EDX, it was confirmed that an oxidation state was formed since oxygen was detected in the modified surface layer formed by diffusion and penetration of the titanium elements. Specifically, it was confirmed that titanium oxide, which is a known photocatalytic material, was generated. It was also confirmed that in the oxidation state of this modified surface layer, the oxide concentration gradually decreased from the surface thereof to the inside (FIGS. 14E and 15E).

Results Using Tin-Based Injection Powders

Surface analysis of a cross-sectional portion obtained by cutting the piston for a gasoline engine injected with the above titanium-based injection powders was performed by SEM-EDX, and the results are shown in FIGS. 16A to 16E. The results of a line analysis of the above cross-sectional view are shown in FIGS. 17A to 17E.

From the above analytical results, a coat including the tin component was formed on the piston surface, and the formation of a uniformly fine-grained modified surface layer was confirmed.

This modified surface layer had a microstructure in which aluminum and silicon components in the piston, which were base materials, were uniformly distributed in a fine-grained state.

Figure 16A:
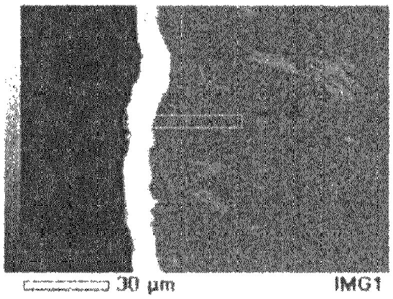
FIGS. 16A to 16E each illustrates an energy dispersive x-ray spectroscopy image obtained by a scanning electron microscope showing a cross-sectional portion of a piston injected with injection powders containing tin according to the present invention, where FIG. 16A indicates a surface analysis image of a modified layer composition, FIG. 16B indicates a surface analysis image of an Al component, FIG. 16C indicates a surface analysis image of an Si component, FIG. 16D indicates a surface analysis image of an Sn component, and 16E indicates a surface analysis image of an O component.
Figure 16B:
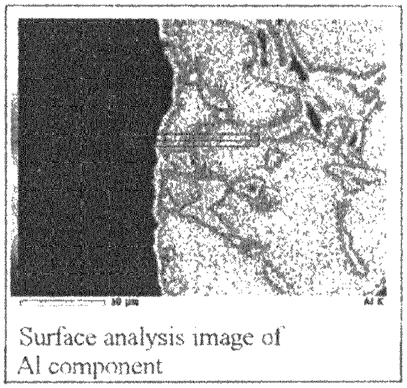
Figure 16C:
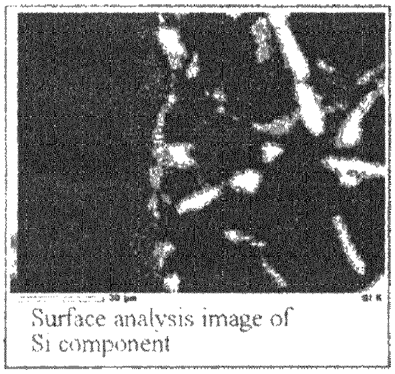
Figure 16D:
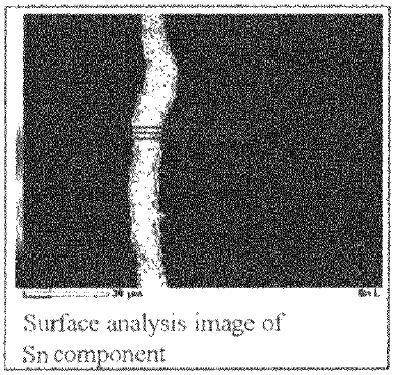
Figure 16E:
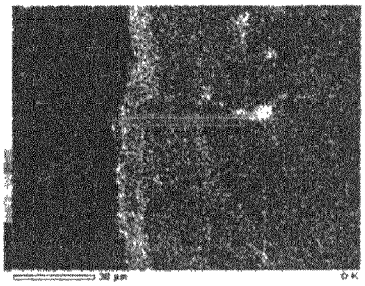
Figure 17A:
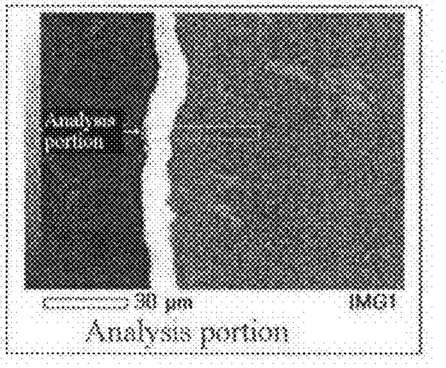
FIGS. 17A to 17E are Al, Si, Sn, and O analysis results by line scanning of the cross-sectional portion of the piston after the treatment according to the present invention shown in FIG. 16A, where FIG. 17A indicates an analysis position, FIG. 17B indicates an Al line analysis graph, FIG. 17C indicates an Si line analysis graph, FIG. 17D indicates an Sn line analysis graph, and FIG. 17E indicates an O line analysis graph.
Figure 17B:
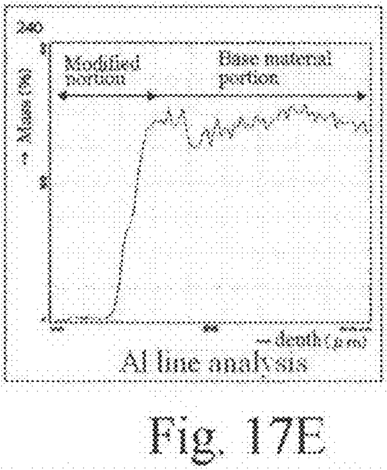
Figure 17C:
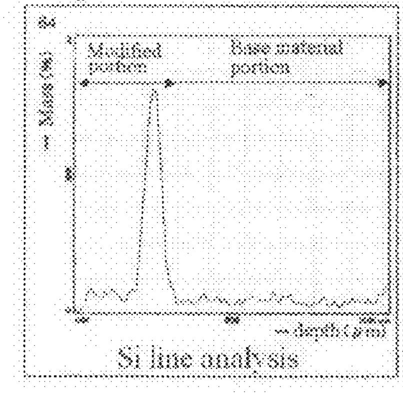
Figure 17D:
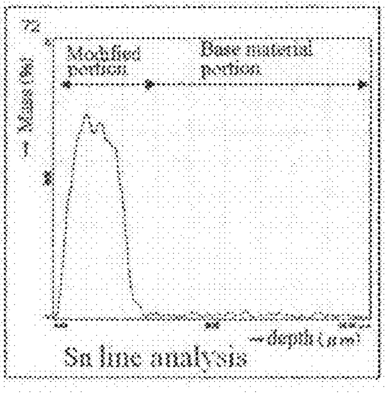
Figure 17E:
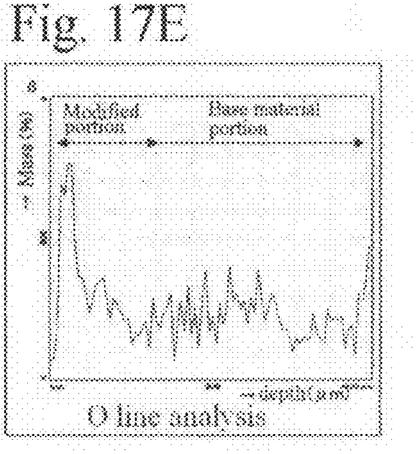

Furthermore, from the analytical results by SEM-EDX, it was confirmed that an oxidation state was formed since oxygen was detected in the modified surface layer. Specifically, it was confirmed that tin oxide, which is a known photocatalytic material, was generated. It was also confirmed that in the oxidation state of this modified surface layer, the oxide concentration gradually decreased from the surface thereof to the inside (FIGS. 16E and 17E).

Results Using Zinc-Based Injection Powders

Surface analysis of a cross-sectional portion obtained by cutting the piston for a gasoline engine injected with the above zinc-based injection powders was performed by SEM-EDX, and the results are shown in FIGS. 18A to 18E. The results of a line analysis of the above cross-sectional view are shown in FIGS. 19A to 19E.

From the above analytical results, it was confirmed that a uniformly fine-grained modified surface layer was formed by diffusion and penetration of the zinc component from the piston (Al) surface to the inside.

This modified surface layer had a composition in which an Si component in an aluminum base material was also present in a fine-grained state.

Figure 18A:
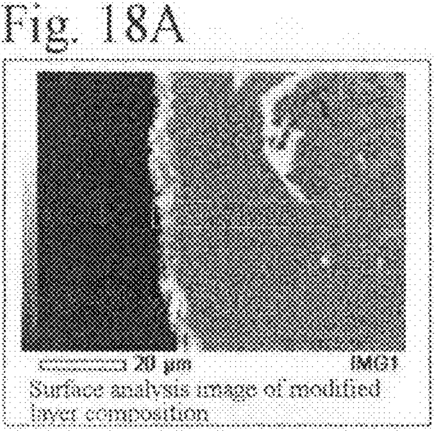
FIGS. 18A to 18E each show an energy dispersive x-ray spectroscopy image obtained by a scanning electron microscope showing a cross-sectional portion of a piston injected with injection powders containing zinc according to the present invention, where FIG. 18A indicates a surface analysis image of a modified layer composition, FIG. 18B indicates a surface analysis image of an Al component, FIG. 18C indicates a surface analysis image of an Si component, FIG. 18D indicates a surface analysis image of a Zn component, and FIG. 18E indicates a surface analysis image of an O component.
Figure 18B:
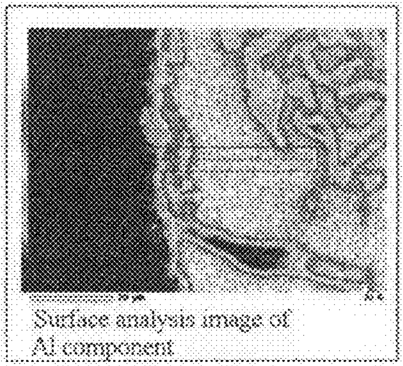
Figure 18C:
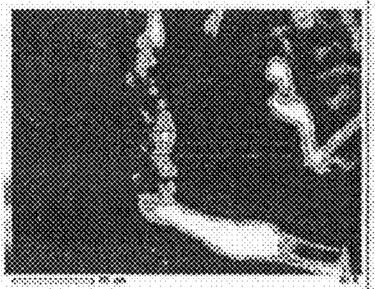
Figure 18D:
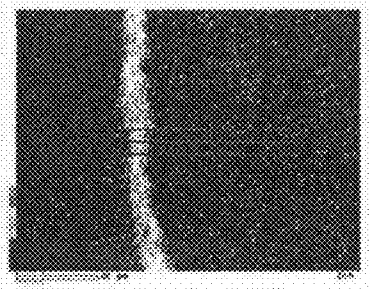
Figure 18E:
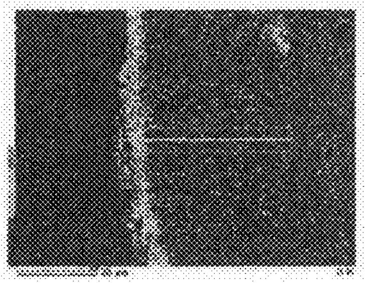
Figure 19A:
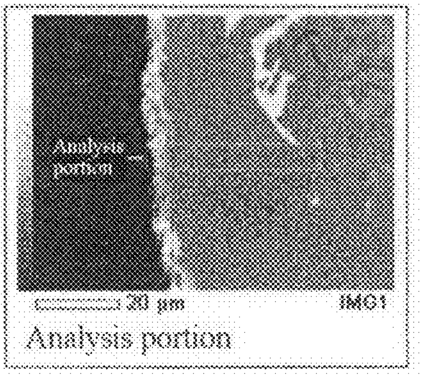
FIGS. 19A to 19E are Al, Si, Zn, and O analysis results by line scanning of the cross-sectional portion of the piston after the treatment according to the present invention shown in FIG. 18A, where FIG. 19A indicates an analysis position, FIG. 19B indicates an Al line analysis graph, FIG. 19C indicates an Si line analysis graph, FIG. 19D indicates a Zn line analysis graph, and FIG. 18E indicates an O line analysis graph.
Figure 19B:
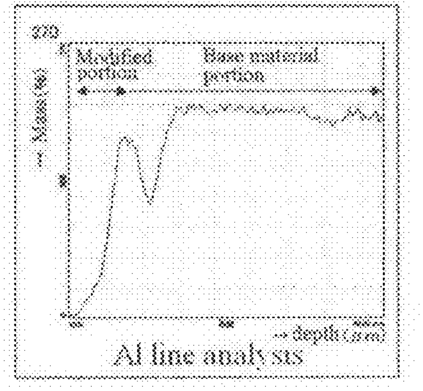
Figure 19C:
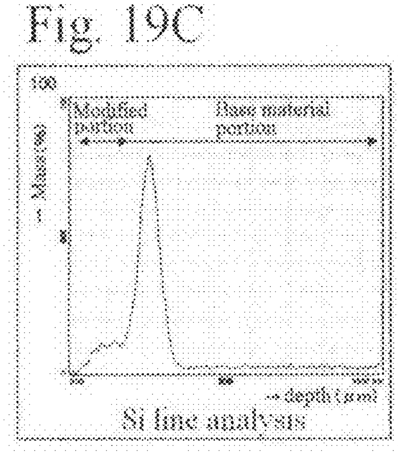
Figure 19D:
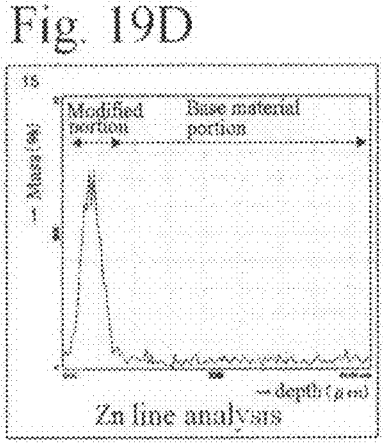
Figure 19E:
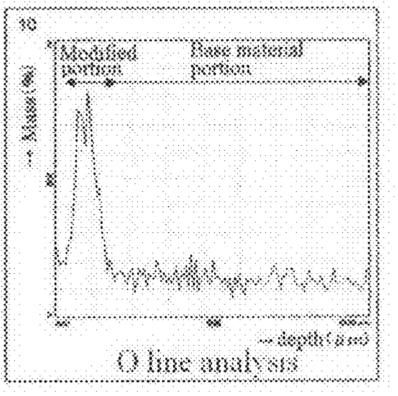

From the analytical results by SEM-EDX, it was confirmed that an oxidation state was formed since oxygen was detected in the modified surface layer. Specifically, it was confirmed that zinc oxide, which is a known photocatalytic material, was generated. It was also confirmed that in the oxidation state of this modified surface layer, the oxide concentration gradually decreased from the surface thereof to the inside (FIGS. 18E and 19E).

Confirmation of Fuel Modification Effect

Of the pistons for gasoline engines each having the modified surface layer thus formed, a fuel (light oil) was brought into contact with the pistons obtained by injecting the titanium-based injection powders and the tin-based injection powders in a dark place at room temperature, and component analysis was then performed by pyrolysis GC-MS measurement.

As a comparative example, a fuel was brought into contact with an internal combustion piston which was similar to that described above and which had a modified surface layer formed by injecting injection powders made of high-speed tool steel having an average particle diameter of 50 μm, and component analysis was then performed by pyrolysis GC-MS measurement. In addition, GC-MS measurement was also performed for untreated light oil, and the results were compared with each other.

A graph of the pyrolysis GC-MS measurement results obtained from the light oil sample of the comparative example which was brought into contact with the piston modified the surface by injecting injection powders made of high-speed tool steel containing iron (Fe) as a reinforcing element showed a waveform which is not changed from that of a graph of the pyrolysis GC-MS measurement results obtained from the untreated light oil sample; hence, it was confirmed that modification of the fuel did not occur, or even if modification did occur, the degree thereof was very low.

On the other hand, as for the light oil samples brought into contact with the pistons each having an unstable compound layer in which the oxygen bonding amount decreased from the surface to the inside, the compound layers being formed by injecting injection powders containing titanium (Ti) and tin (Sn), each of which is an element exhibiting a photocatalytic function by oxidation, it was found from the results of the change in pyrolytic behavior, that chain aliphatic hydrocarbons, which are primary light oil components, were decomposed, hence, it was confirmed that decomposition of light oil was facilitated.

Figure 20:
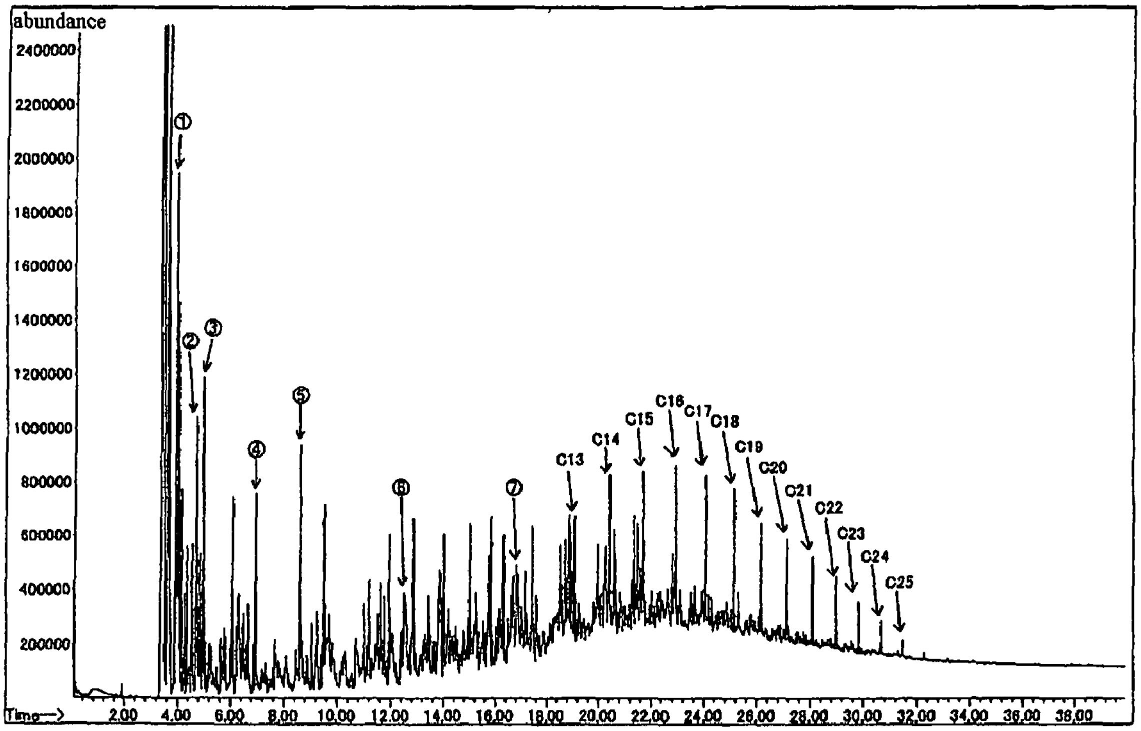
FIG. 20 is a graph showing a pyrolysis GC-MS measurement result of a light oil sample in contact with a piston injected with injection powders containing tin.
Figure 21:
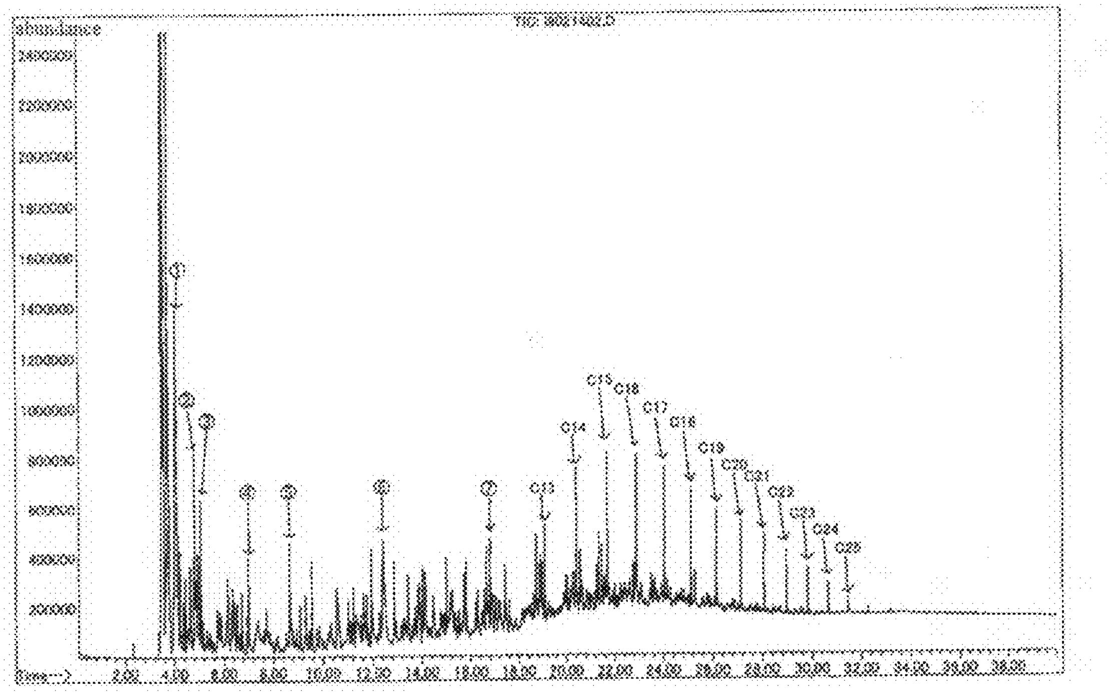
FIG. 21 is a graph showing a pyrolysis GC-MS measurement result of an untreated light oil sample.

FIG. 20 is a graph showing the pyrolysis GC-MS measurement result of the light oil sample which was brought into contact with the piston having a modified surface layer formed by injecting injection powders containing tin, and FIG. 21 is a graph showing the pyrolysis GC-MS measurement result of the untreated light oil sample.

In the graphs showing the pyrolysis GC-MS measurement results, in general, C13 to C25 are aliphatic hydrocarbons, which are primary components of light oil, and the aliphatic hydrocarbons periodically observed from C13 to the right side in the graph are constituent elements originally contained in the light oil.

In the pyrolysis analyzer used for this measurement, because of the features of this analyzer, the temperature was increased to 700° C. for a very short time of 1 second or less, and pyrolyzed and evaporated components were introduced into an instant analysis line; hence, although heating was performed in the air, complete combustion could not be performed.

Peaks around the hydrocarbons (C13 to C25) and low molecular weight components observed from the hydrocarbon of C13 to the left side in the graph are pyrolyzed products from light oil. Hence, the pyrolytic properties can be confirmed from the differences between pyrolyzed products (1) to (7) shown in the figures.

Since the graph of the pyrolysis GC-MS measurement result obtained from the light oil sample which was brought into contact with the piston treated by injecting injection powders containing tin, shown in FIG. 20, is clearly different from the graph of the pyrolysis GC-MS measurement result obtained from the untreated light oil sample, in terms of the generation state of the decomposed products (1) to (7), and in particular, in terms of the generation state of the decomposed products (5) and (6), from the results of the change in pyrolytic behavior, it was found that the chain hydrocarbons, as the primary light oil components, were decomposed; hence, it was confirmed that the decomposition of light oil was facilitated (In FIG. 20, reference numerals for the decomposed products (1) to (7) are indicated with circled numbers.).

When pyrolysis of light oil is facilitated, combustion is facilitated, and the molecular weights of hydrocarbons used as an agent for reducing $NO_x$ is increased. Hence, it is apparent that the change described above contributes to improvement in combustion (reduction in $CO_2$ exhaust amount) and reduction in NOx exhaust amount.

In addition, since a flame propagation speed (combustion inside the cylinder) is improved by improvement in pyrolytic properties, ignition lag in a high rotation speed region is prevented, and knocking is also reduced. Furthermore, an effect of decreasing the combustion chamber temperature and of increasing the torque in a high rotation speed region is also obtained.

Accordingly, with the piston treated by the surface treatment described above, besides the improvement in fuel consumption due to modification of the fuel, the amount of exhaust $CO_2$ gas is reduced by complete combustion or a state close thereto. In addition, since the temperature inside the combustion chamber is decreased, the generation of $NO_x$ is reduced, so that the amount of exhaust gas is reduced.

Furthermore, since the fuel modification as described above is performed when the piston having a modified surface layer formed by the method according to the present invention is brought into contact with the fuel in a dark place at room temperature, irradiation of light and high-temperature conditions are not required for the fuel modification, hence, the fuel modification can be performed even at a starting stage of the engine, when the temperature of the piston is not increased, so that improvement in combustion properties and reduction in generation of $CO_2$ gas, $NO_x$, and the like can be expected immediately after the engine is started, by virtue of the fuel modification.

Experimental Operation Test for Internal Combustion Engine

After pistons having modified surface layers formed on the top surfaces by injecting injection powders containing titanium (Ti) or tin (Sn) and untreated pistons were both fitted in an inline four-cylinder engine, the engine was operated for 20 hours, and the exhaust gas temperature and the carbon adhesion on the top surface were observed.

In this example, the untreated pistons were fitted in second and fourth cylinders, a piston injected with powdered titanium was fitted in the first cylinder, and a piston injected with powdered tin was fitted in the third cylinder.

The engine used in the experiment and other experiment conditions are shown in Table 9.

Example 9

| Experimental engine<br>Inline four-cylinder diesel engine (Turbo with intercooler) | |
|---|---|
| Use fuel | Standard light fuel |
| Lubricant | 10W-30 CF-4 |

Experimental Results

Carbon Adhesion State

The results of carbon adhesion to the pistons are shown in Table 10.

TABLE 10

| | Carbon Deposition on the Piston Top Surface | | | |
|---|---|---|---|---|
| | Cylinder No. | | | |
| | 1 (injected with Sn) | 2 (Untreated) | 3 (injected with Ti) | 4 (Untreated) |
| Carbon Deposition | No | Yes | No | YES |

Exhaust-Gas Temperature

Figure 22:
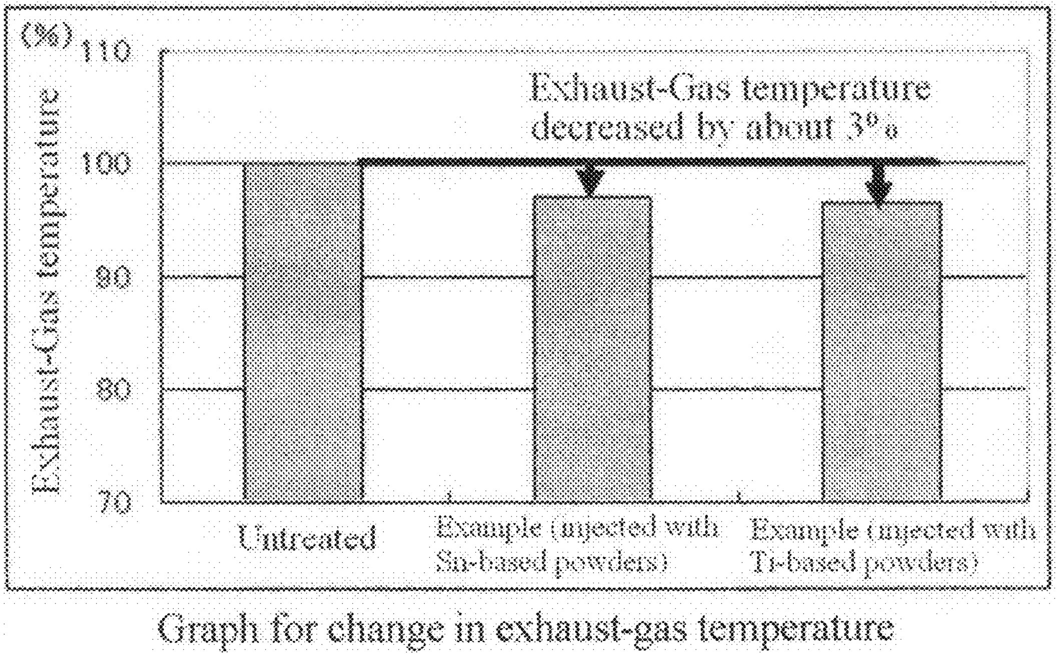
FIG. 22 is a graph showing measurement results of the temperature of an exhaust gas from a cylinder in which a piston surface-treated by the method according to the present invention is fitted and the temperature of an exhaust gas from a cylinder in which an untreated piston is fitted, obtained by an experimental operation test using an internal combustion engine described in an Example.

According to the measurement results of temperatures (average value for 60 seconds) of exhaust gas discharged from the cylinders, although the exhaust-gas temperatures of the second and fourth cylinders fitted with the untreated pistons were approximately 670° C., it was confirmed that the exhaust-gas temperature of the first cylinder fitted with the piston treated by injecting injection powders containing powdered tin and that of the third cylinder fitted with the piston treated by injecting injection powders containing powdered titanium were lower by approximately 20° C. (approximately 3% lower when the exhaust-gas temperature from the cylinder fitted with the untreated piston is defined as 100) (see FIG. 22).

Discussion of Experimental Results

From the experimental results described above, with the piston having a modified surface layer formed by the method according to the present invention, it is believed that, since the combustion properties in the cylinder were improved because of the fuel modification using the photocatalytic function of the modified surface layer, the generation of carbon itself is reduced, or even if carbon is generated, it is decomposed by the photocatalytic function. Hence, degradation in fuel consumption caused by the change in volume does not occur, and it is confirmed that improvement in combustion efficiency can be stably obtained for a long period of time.

In addition, the reason for the decrease in exhaust-gas temperature from the cylinder in which the piston having a modified surface layer formed by the method according to the present invention is fitted is believed to be because fuel in the cylinder is completely combusted or is combusted in a state close to complete combustion because of fuel modification due to the photocatalytic function, no afterburning occurs in an exhaust pipe, and as a result, the exhaust-gas temperature is decreased.

According to the results described above, when using the piston having a modified surface layer in the top surface thereof formed by the method of the present invention to have a photocatalytic function, the combustion in the cylinder can be performed in a complete combustion state or in a state close thereto, and hence the fuel consumption is improved, and the amount of fuel can be reduced. In addition, concomitant therewith, reduction in exhaust amount of $CO_2$ gas, decrease in combustion temperature, and reducing of generation of $NO_x$ due to an increase in molecular weight of hydrocarbons used as a reducing agent for $NO_x$ by fuel modification can be expected.

Thus the broadest claims that follow are not directed to a machine that is configured in a specific way. Instead, the broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Additionally although individual features may be included in different claims, these may possibly be advantageously combined and the inclusion in different claims does not imply that a combination of features is not feasible and/or advantageous. In further addition singular references do not exclude a plurality. Thus references to “a”, “an”, “first”, “second” etc. do not preclude a plurality.

What is claimed is:

1. A method for surface treatment of an internal combustion piston made from casting and forging of an aluminum-silicon alloy comprising:

providing injection powders having a diameter of 20 μm to 400 μm and containing a reinforcing element, diffusing and penetrating the reinforcing element on a surface of the internal combustion piston by injecting the injection powders to collide with the surface of the internal combustion piston at an injection speed of 80 m/s or more or at an injection pressure of 0.3 MPa or more, whereby oxides of surface flaw portions generated on said piston surface by said casting and forging are removed, said surface flaw portions generated on said surface are repaired, an alloy element in said alloy of said piston is fine-grained in vicinity of said surface of said piston, and whereby a modified layer having a uniformly fine-grained metal microstructure which contains said alloy element and said reinforcing element is formed on said piston surface;

wherein an element exhibiting a photocatalytic function by oxidation is selected as said reinforcing element, and said modified layer is formed on a top surface of said piston, in which said reinforcing element is oxidized so that bonding with oxygen is decreased from a surface of said modified layer to an inside of said modified layer; and said injection powders containing said reinforcing element further include a noble metal element, and said noble metal element is supported in said modified layer.

2. A method for surface treatment of an internal combustion piston made from casting and forging of an aluminum-silicon alloy comprising:

providing injection powders having a diameter of 20 μm to 400 μm and containing a reinforcing element, diffusing and penetrating the reinforcing element on a surface of the internal combustion piston by injecting the injection powders to collide with the surface of the internal combustion piston at an injection speed of 80 m/s or more or at an injection pressure of 0.3 MPa or more, whereby oxides of surface flaw portions generated on said piston surface by said casting and forging are removed, said surface flaw portions generated on said surface are repaired, an alloy element in said alloy of said piston is fine-grained in vicinity of said surface of said piston, and whereby a modified layer having a uniformly fine-grained metal microstructure which contains said alloy element and said reinforcing element is formed on said piston surface;

wherein an element exhibiting a photocatalytic function by oxidation is selected as said reinforcing element, and said modified layer is formed on a top surface of said piston, in which said reinforcing element is oxidized so that bonding with oxygen is decreased from a surface of said modified layer to an inside of said modified layer; and further comprising injecting injection powders containing a noble metal element on said modified layer so that said noble metal element is supported in said modified layer.

3. A method for surface treatment of an internal combustion piston made from casting and forging of an aluminum-silicon alloy comprising:

providing injection powders having a diameter of 20 μm to 400 μm and containing a reinforcing element, diffusing and penetrating the reinforcing element on a surface of the internal combustion piston by injecting the injection powders to collide with the surface of the internal combustion piston at an injection speed of 80 m/s or more or at an injection pressure of 0.3 MPa or more, whereby oxides of surface flaw portions generated on said piston surface by said casting and forging are removed, said surface flaw portions generated on said surface are repaired, an alloy element in said alloy of said piston is fine-grained in vicinity of said surface of said piston, and whereby a modified layer having a uniformly fine-grained metal microstructure which contains said alloy element and said reinforcing element is formed on said piston surface;

wherein a mixed fluid including said injection powders and nitrogen gas is injected on said piston surface to form said modified layer; and said nitrogen gas is low-temperature compressed nitrogen gas at a temperature of 0° C. or less.

4. The method for surface treatment of an internal combustion piston according to claim 3, wherein said modified layer contains aluminum nitride and silicon nitride.

5. A method for surface treatment of an internal combustion piston made from casting and forging of an aluminum-silicon alloy comprising:

providing injection powders having a diameter of 20 μm to 400 μm and containing a reinforcing element, diffusing and penetrating the reinforcing element on a surface of the internal combustion piston by injecting the injection powders to collide with the surface of the internal combustion piston at an injection speed of 80 m/s or more or at an injection pressure of 0.3 MPa or more, whereby oxides of surface flaw portions generated on said piston surface by said casting and forging are removed, said surface flaw portions generated on said surface are repaired, an alloy element in said alloy of said piston is fine-grained in vicinity of said surface of said piston, and whereby a modified layer having a uniformly fine-grained metal microstructure which contains said alloy element and said reinforcing element is formed on said piston surface;

wherein said injection powders contain a photocatalytic element exhibiting a photocatalytic function by oxidation, and said photocatalytic element is diffused and penetrated in vicinity of said surface of said piston, whereby a modified layer having a uniformly fine-grained metal microstructure which contains said alloy element in said alloy of said piston, and said reinforcing element and said photocatalytic element in said injection powders is formed on a top surface of said piston, in which said photocatalytic element is oxidized so that bonding with oxygen is decreased from the surface of said modified layer to the inside of said modified layer; and said injection powders further include a noble metal element, and said noble metal element is supported in said modified layer.

* * * * *